(12) United States Patent
Stipes et al.

(10) Patent No.: US 6,664,946 B1
(45) Date of Patent: Dec. 16, 2003

(54) DUAL AXIS ARTICULATED COMPUTER INPUT DEVICE AND METHOD OF OPERATION

(75) Inventors: Matthew J. Stipes, Woodinville, WA (US); Kurt Nielsen, Mukilteo, WA (US); Thomas W. Brooks, Seattle, WA (US); Wolfgang A. Mack, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/255,510

(22) Filed: Feb. 22, 1999

(51) Int. Cl.[7] ............................. G09G 5/08; A63F 13/02
(52) U.S. Cl. ......................................... 345/157; 463/36
(58) Field of Search ................... 345/156, 161, 345/162, 157, 122; 463/36, 37, 38, 39

(56) References Cited

U.S. PATENT DOCUMENTS

| | | | | |
|---|---|---|---|---|
| 4,795,952 A | * | 1/1989 | Brandstetter | 318/560 |
| 5,059,958 A | | 10/1991 | Jacobs et al. | 345/158 |
| 5,296,871 A | * | 3/1994 | Paley | 345/163 |
| 5,440,326 A | * | 8/1995 | Quinn | 345/156 |
| 5,576,727 A | * | 11/1996 | Rosenberg et al. | 345/179 |
| 5,589,828 A | * | 12/1996 | Armstrong | 341/20 |
| 5,590,062 A | * | 12/1996 | Nagamitsu et al. | 364/178 |
| 5,624,117 A | * | 4/1997 | Ohkubo et al. | 273/148 B |
| 5,694,153 A | | 12/1997 | Aoyagi et al. | 345/161 |
| 5,703,623 A | * | 12/1997 | Hall et al. | 345/158 |
| 5,739,811 A | | 4/1998 | Rosenberg et al. | 345/161 |
| 5,785,317 A | * | 7/1998 | Sasaki | 273/148 B |
| 5,898,432 A | * | 4/1999 | Pinard | 345/334 |
| 5,903,257 A | * | 5/1999 | Nishiumi et al. | 345/157 |
| 6,100,871 A | * | 8/2000 | Min | 345/145 |
| 6,198,471 B1 | * | 3/2001 | Cook | 345/161 |

FOREIGN PATENT DOCUMENTS

| | | |
|---|---|---|
| EP | 0680132 | 11/1995 |
| JP | 07 116351 | 5/1995 |
| JP | 08 103567 | 4/1996 |

OTHER PUBLICATIONS

Copy of French Search Report dated Dec. 4, 2002.

* cited by examiner

Primary Examiner—Richard Hjerpe
Assistant Examiner—Kevin M. Nguyen
(74) Attorney, Agent, or Firm—Westman, Champlin & Kelly, P.A.

(57) ABSTRACT

The present invention provides a dual axis articulated computer input device. Position sensors are configured to provide position information indicative of a position of two handle members relative to one another.

23 Claims, 21 Drawing Sheets

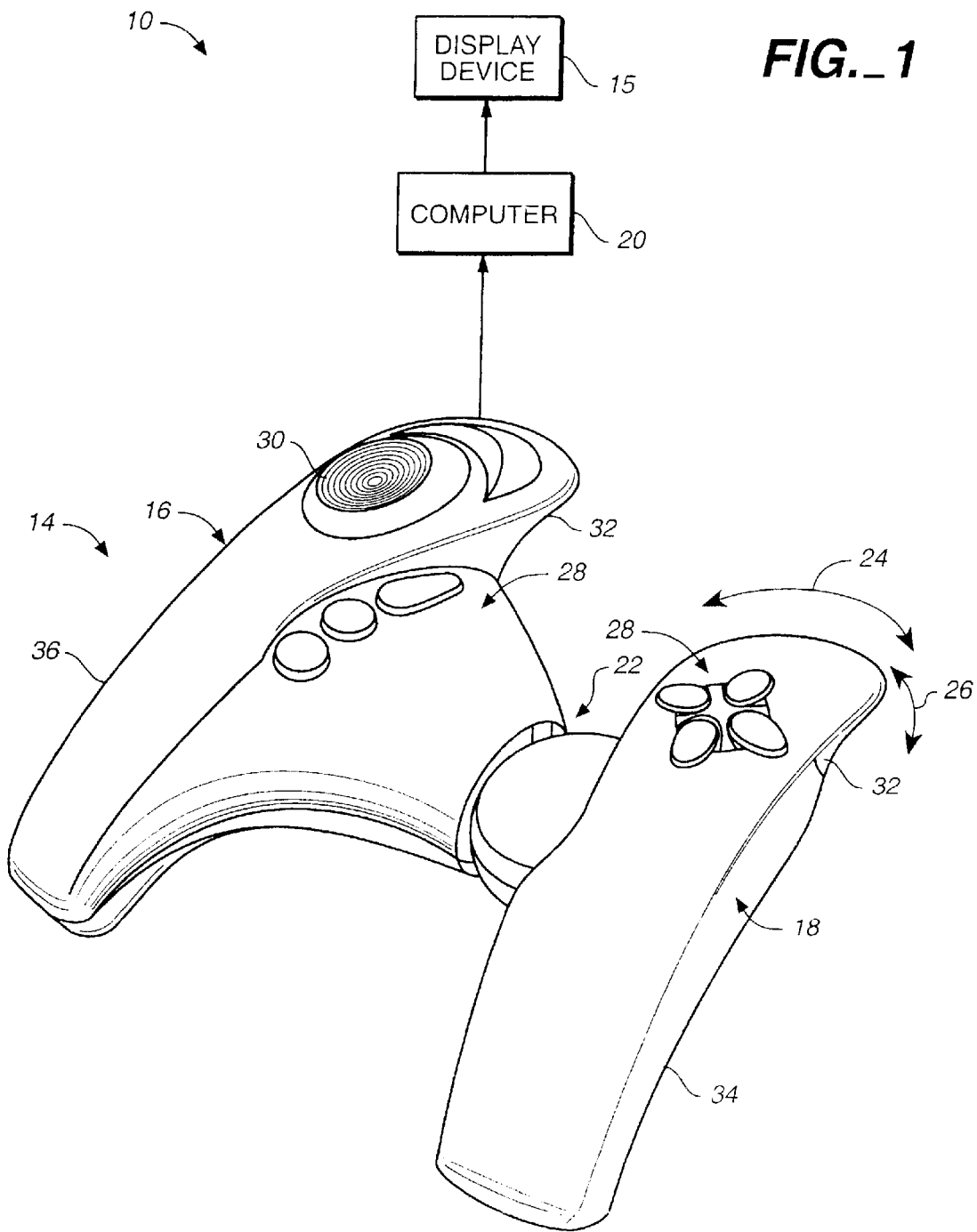
FIG._1

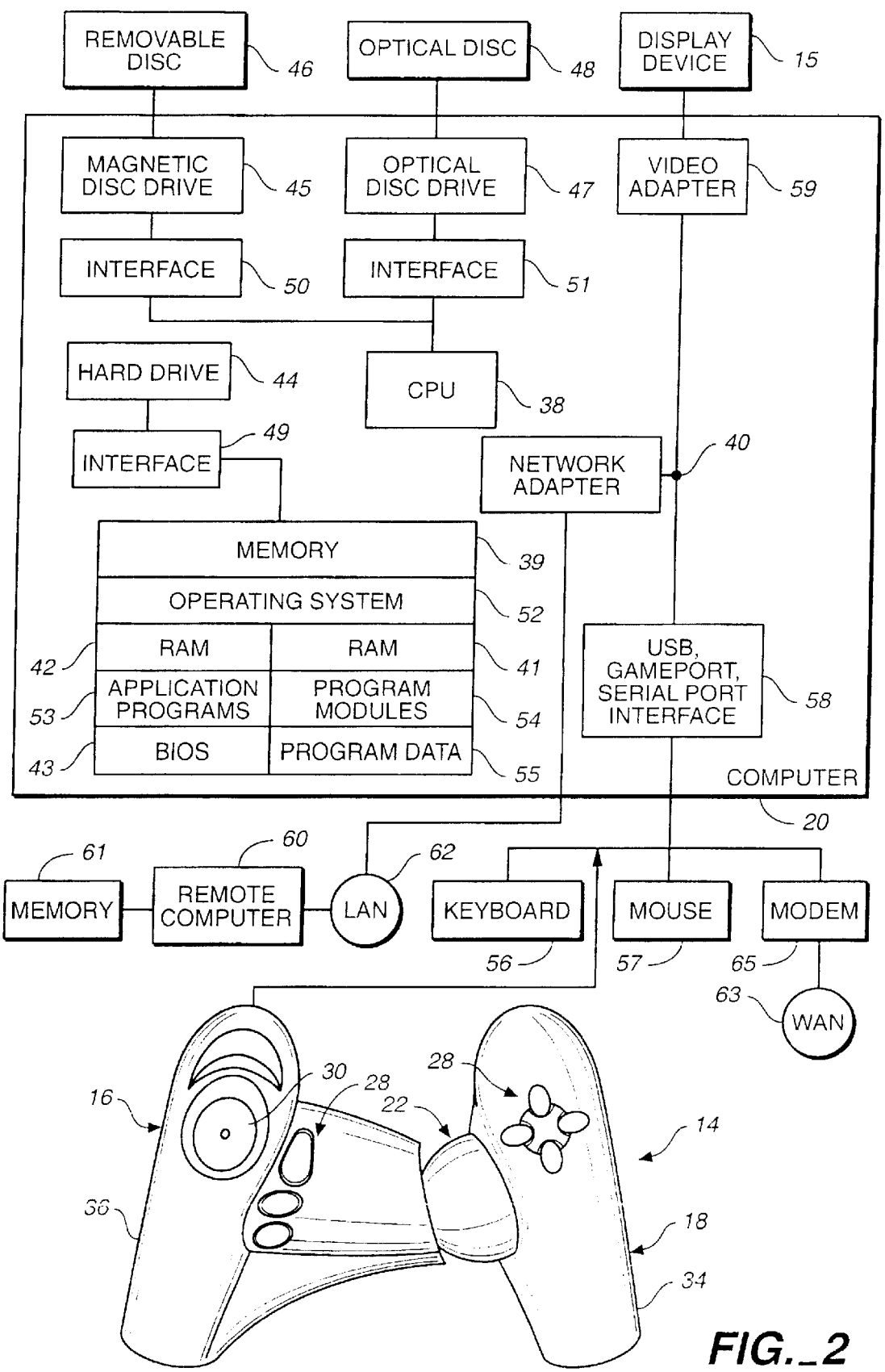
FIG._2

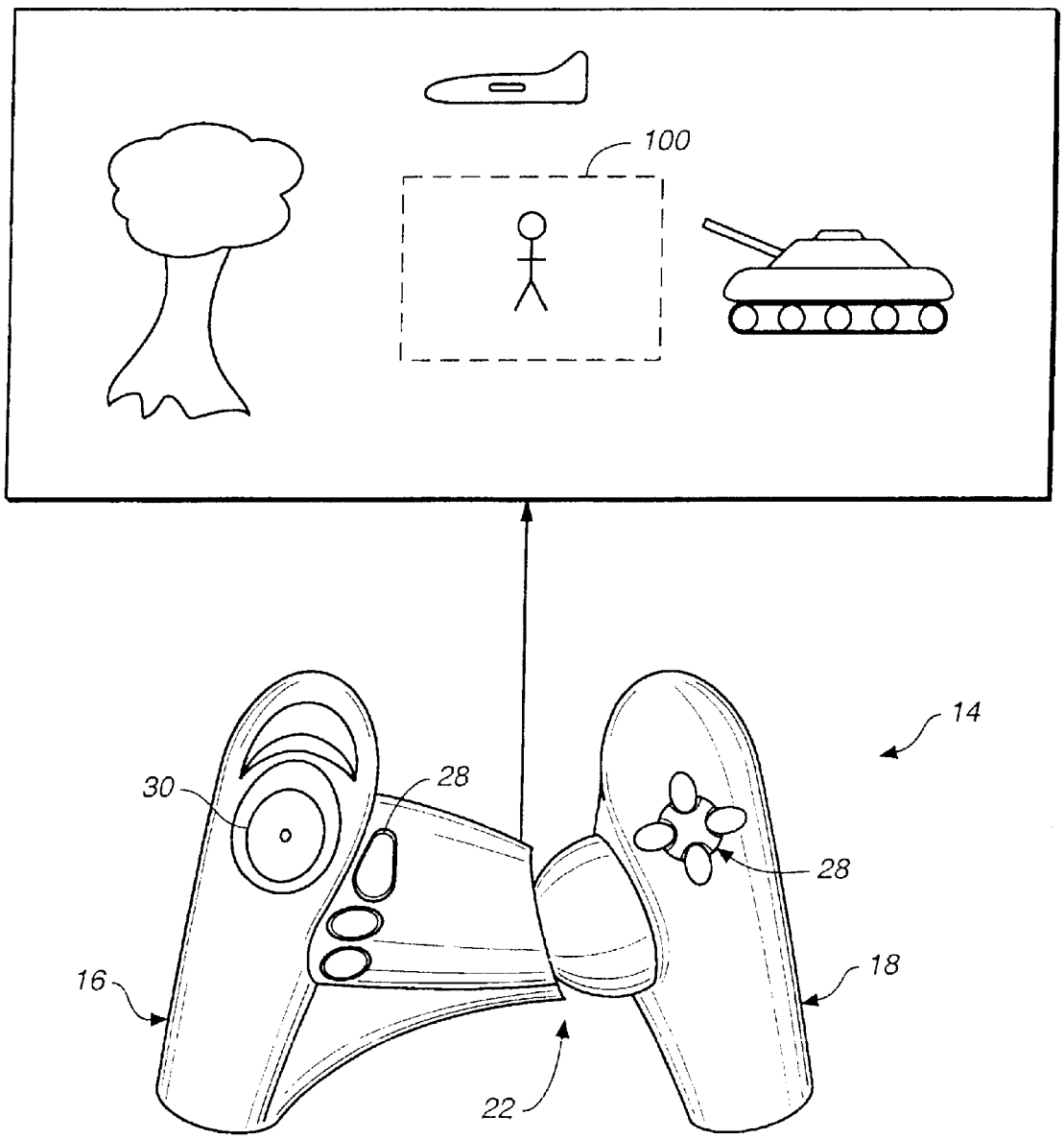
FIG._3A

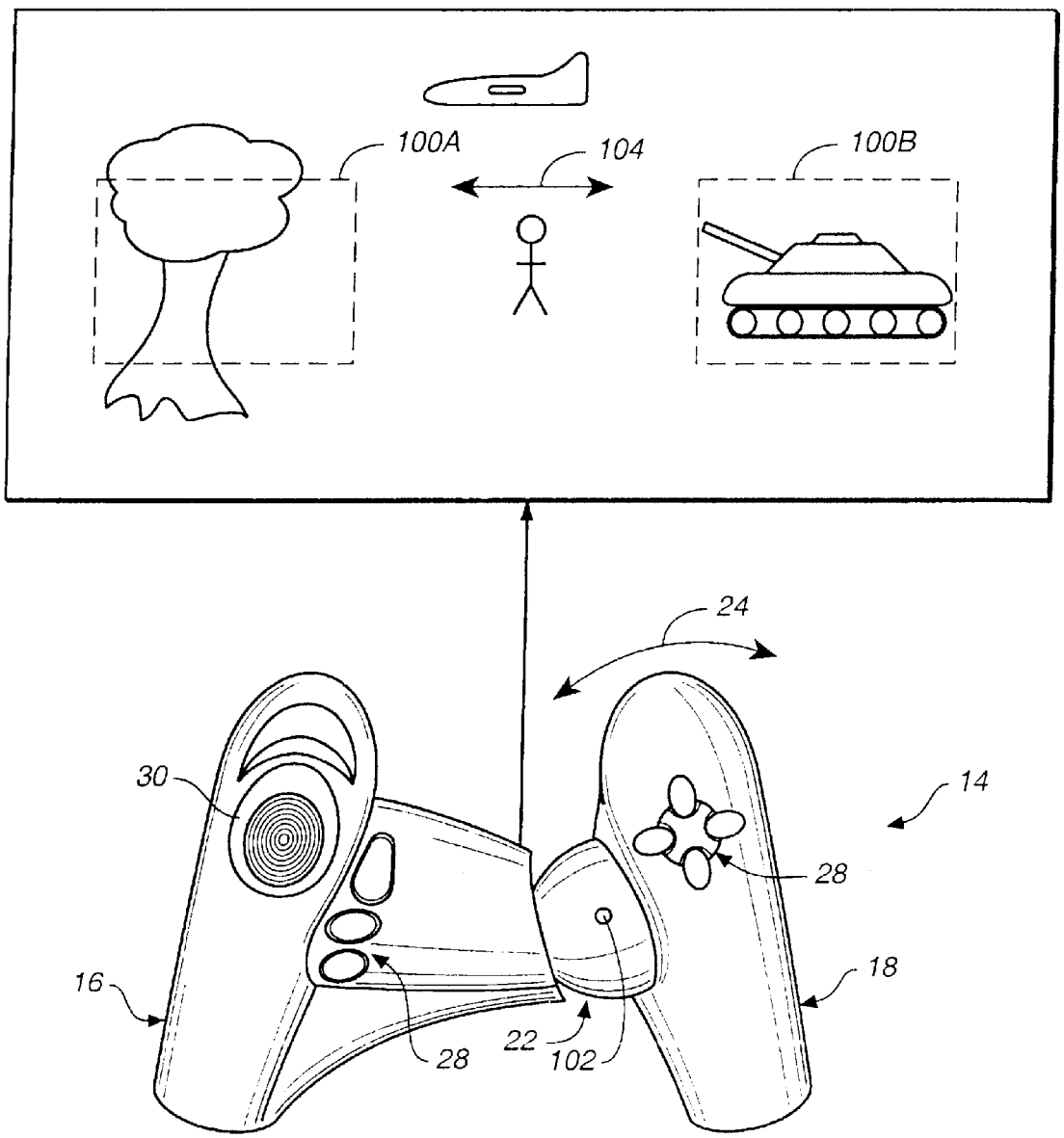
FIG._3B

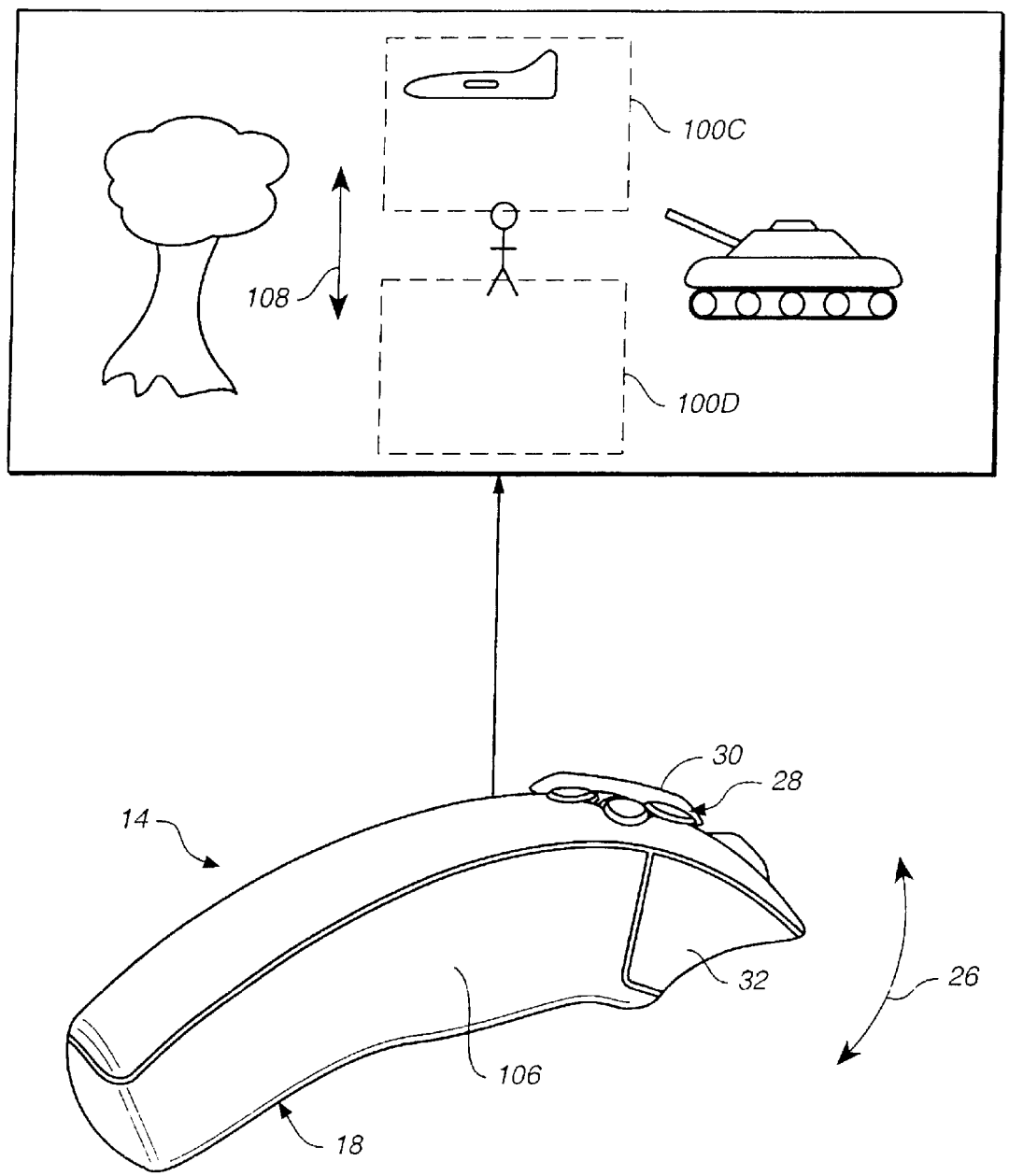
FIG._3C

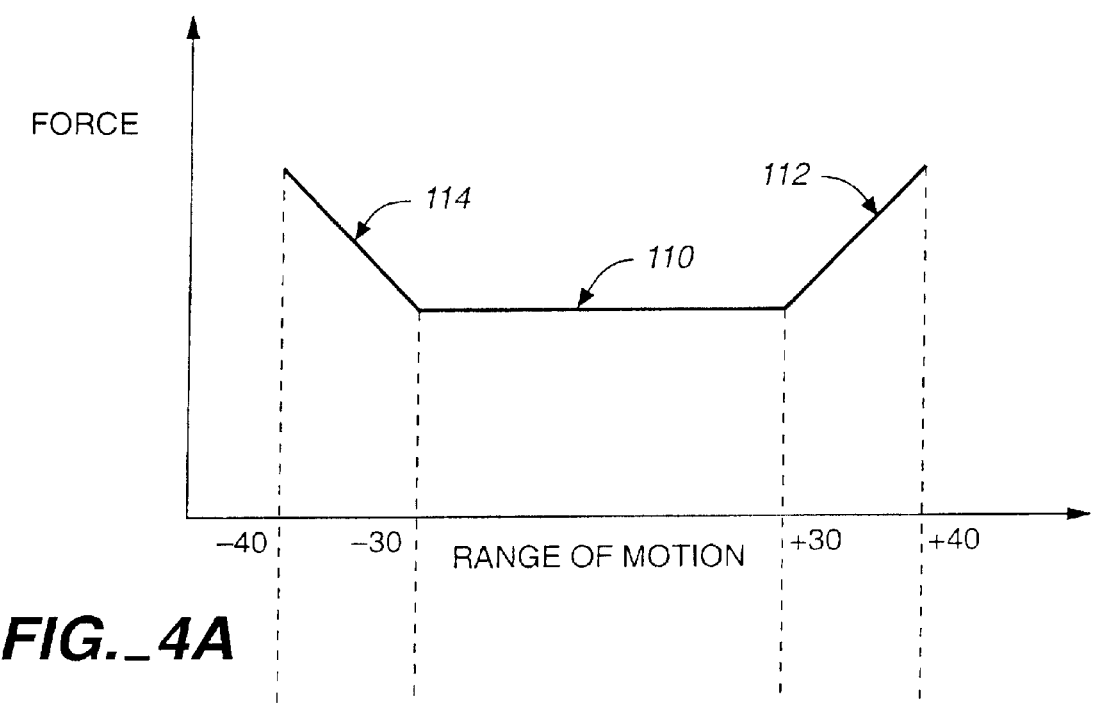
FIG._4A
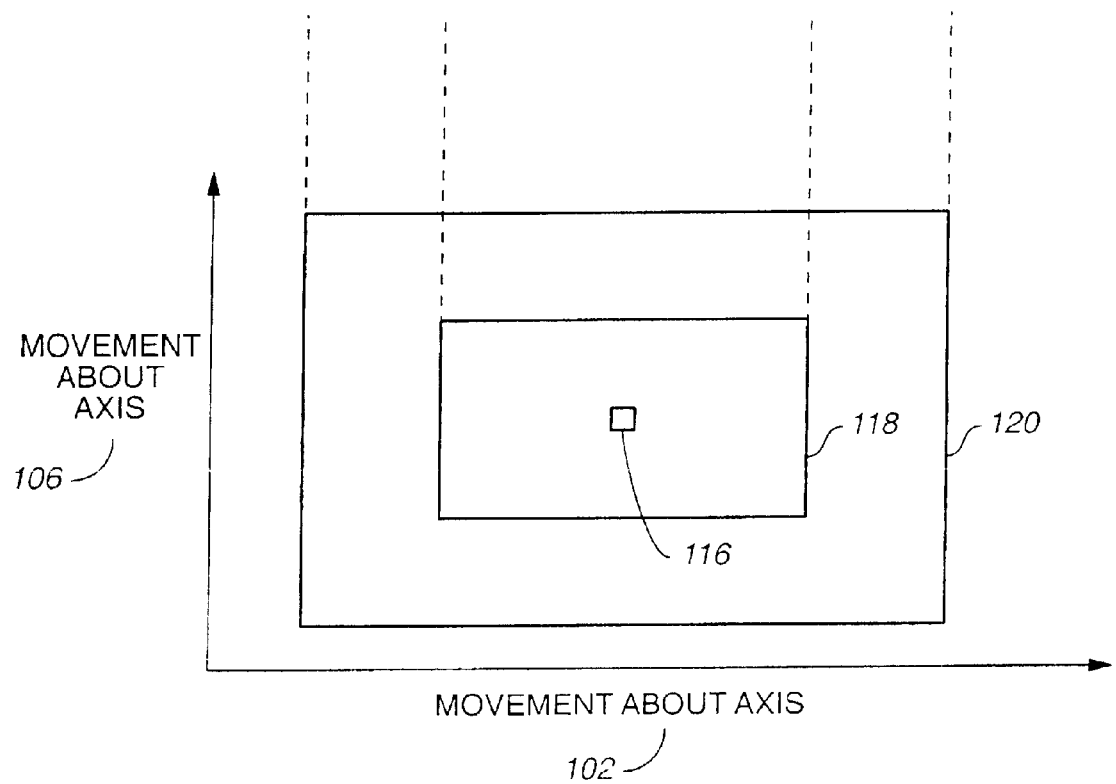
FIG._4B

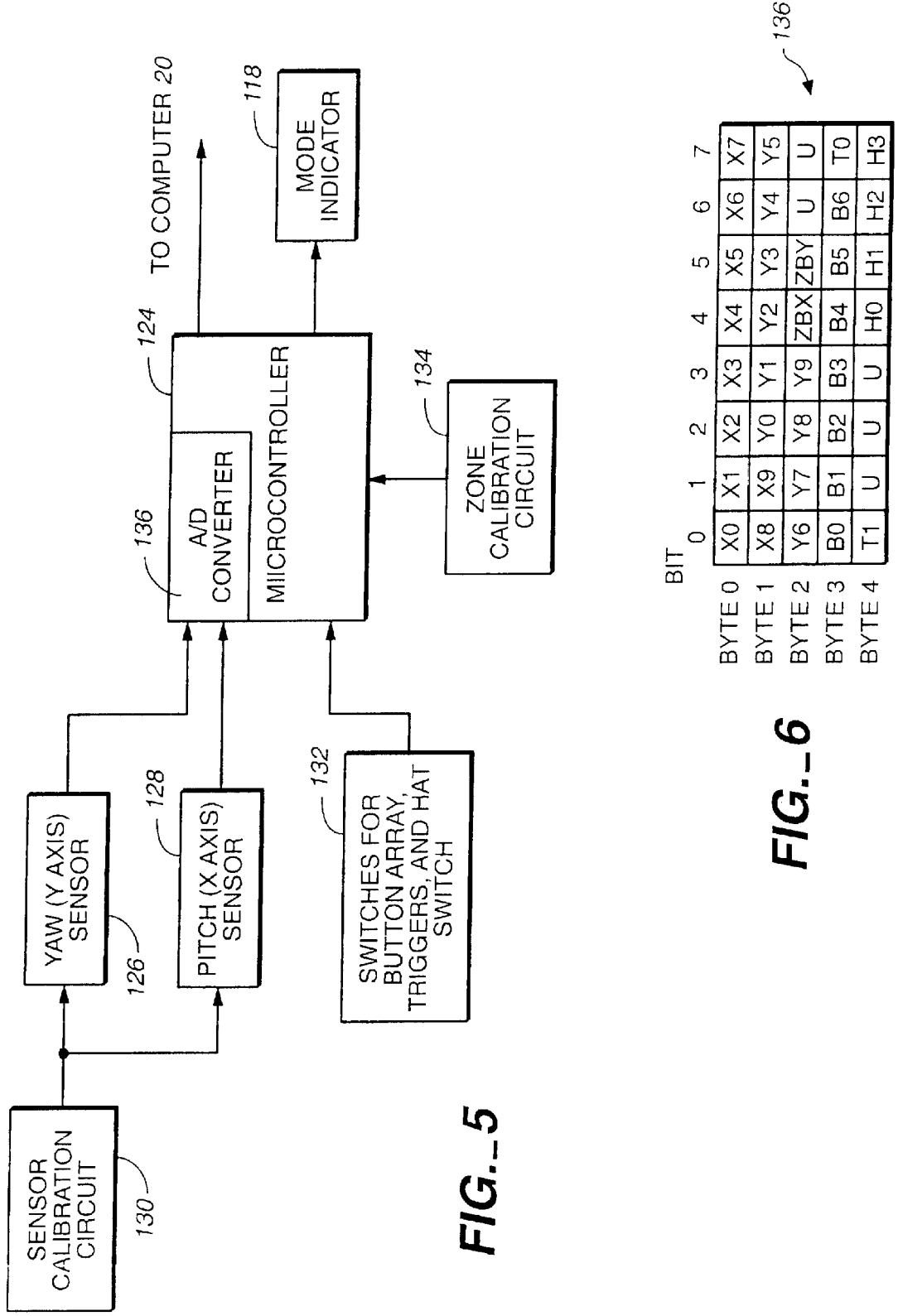

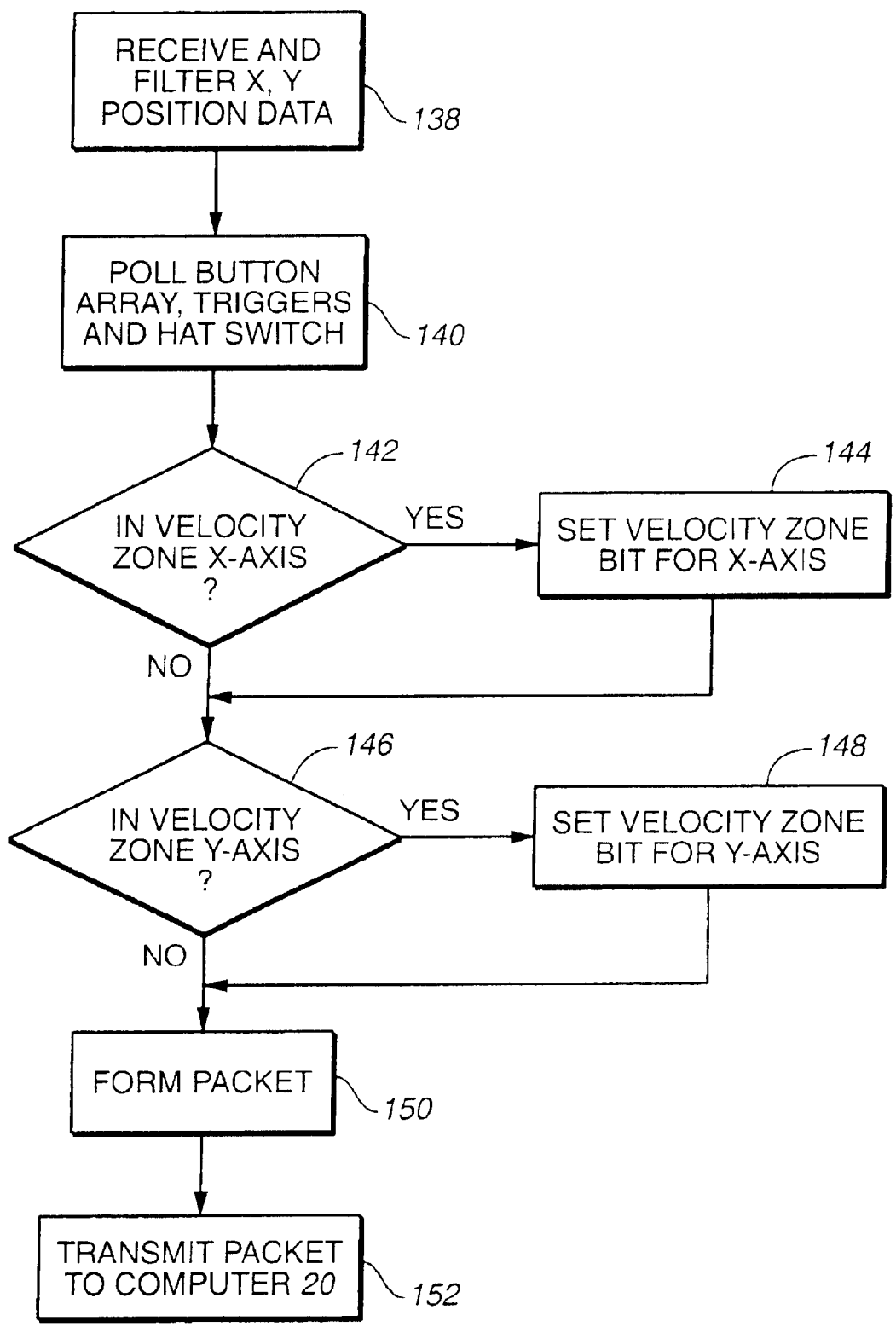
FIG._7

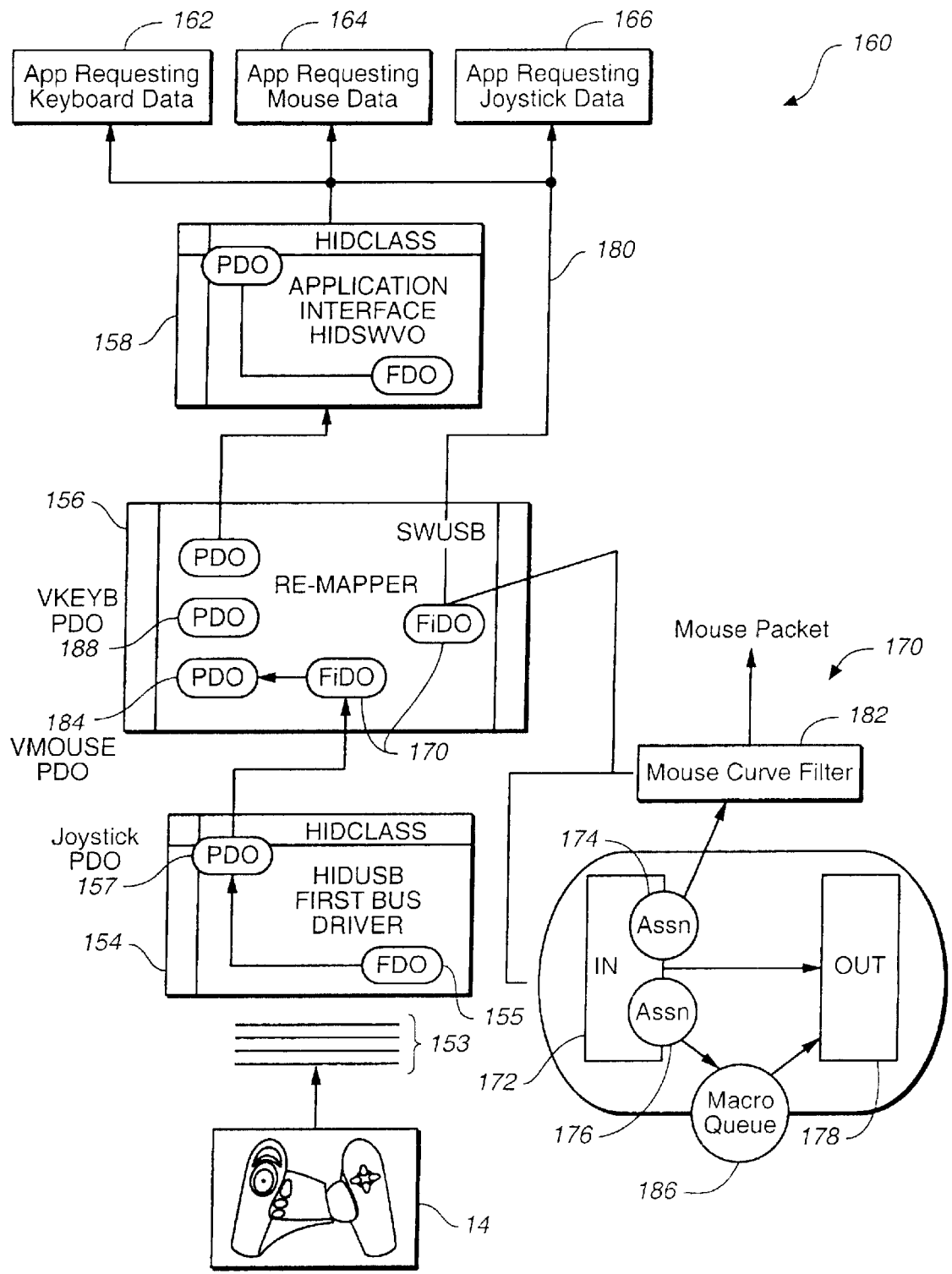
FIG._8

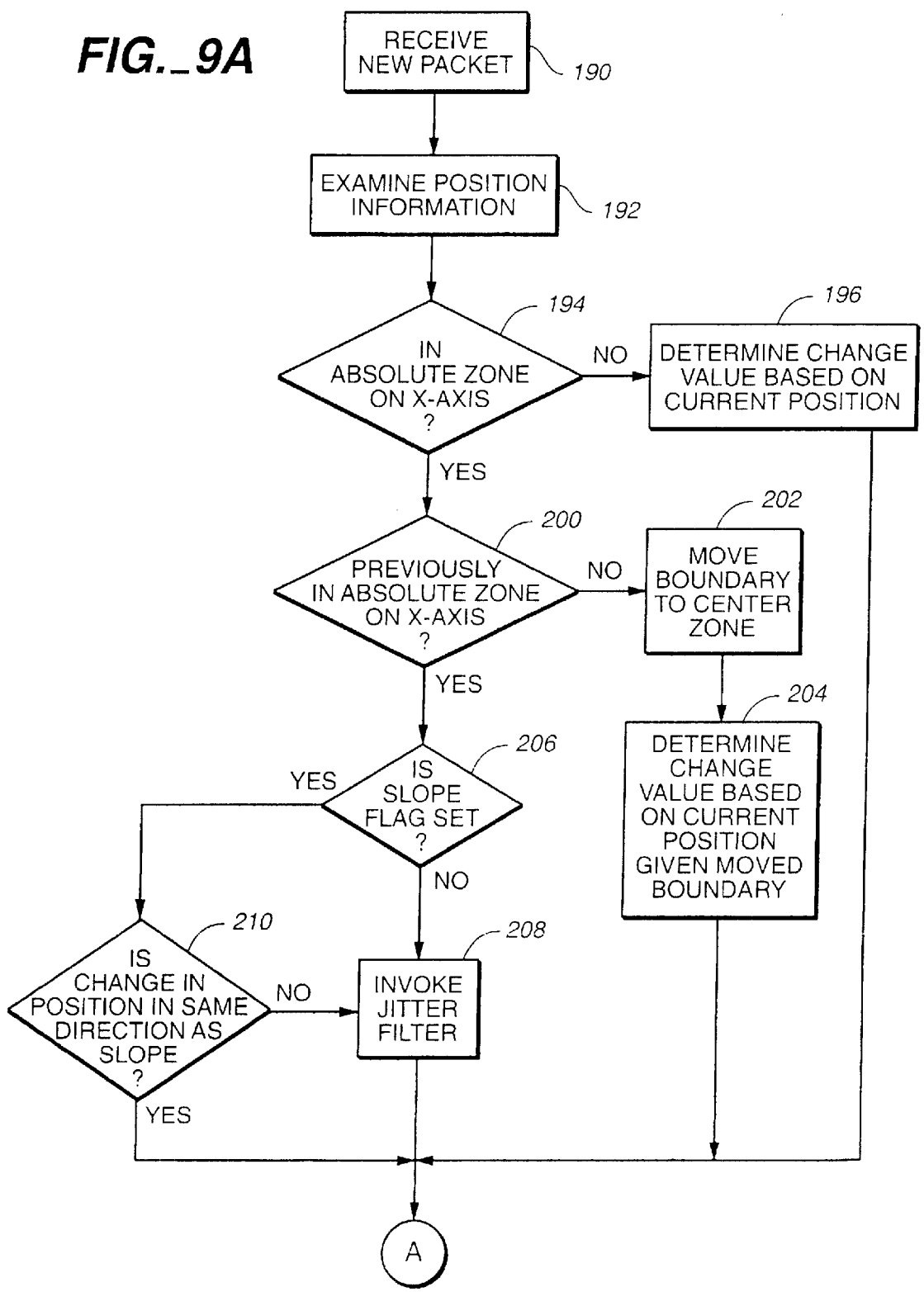
FIG._9A

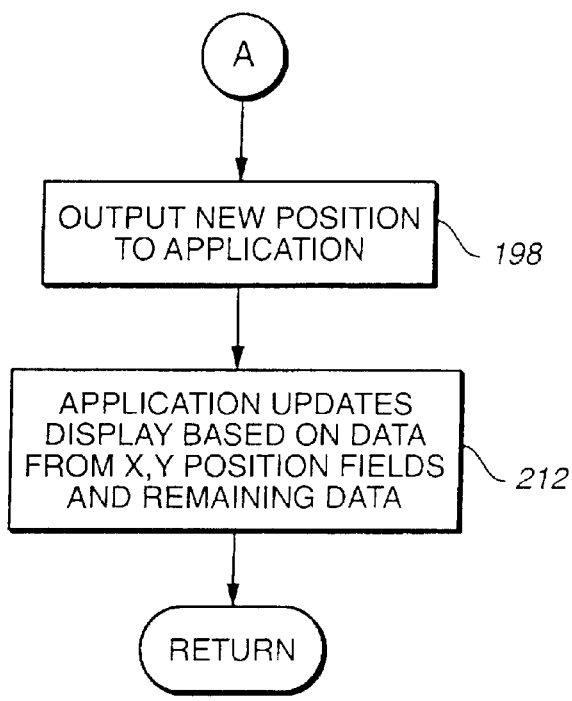
FIG._9B
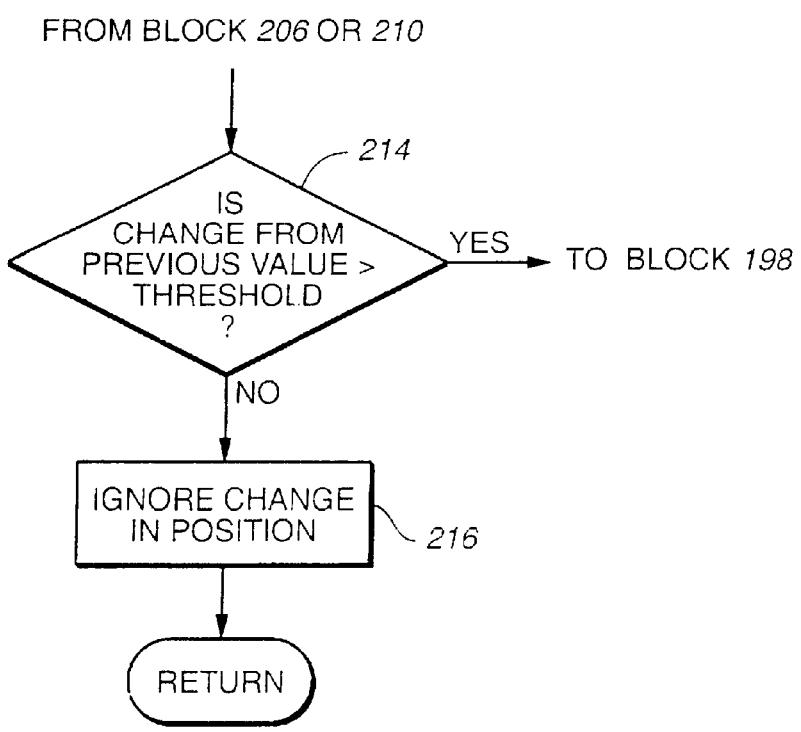
FIG._9C

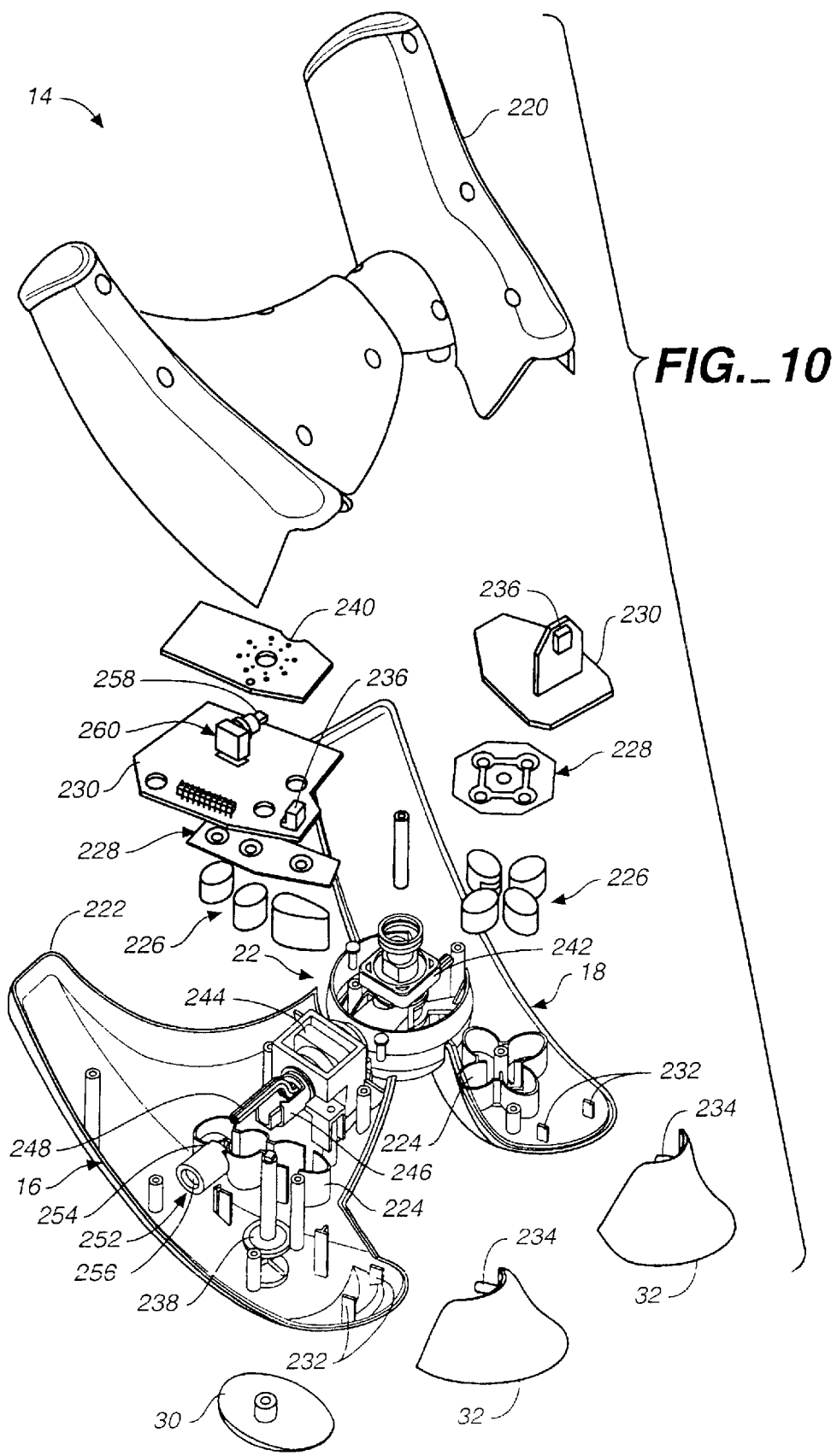
FIG._10

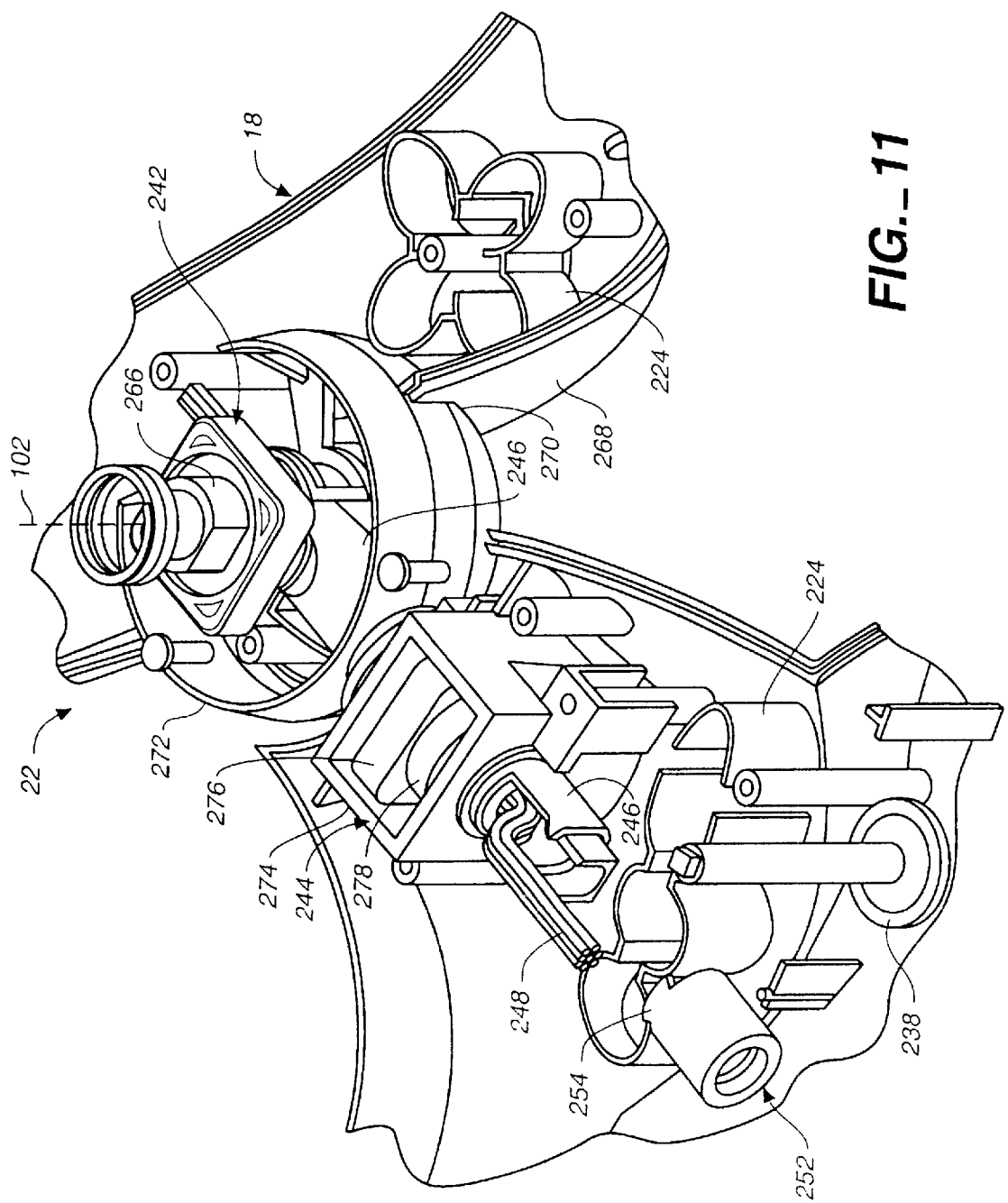
FIG._11

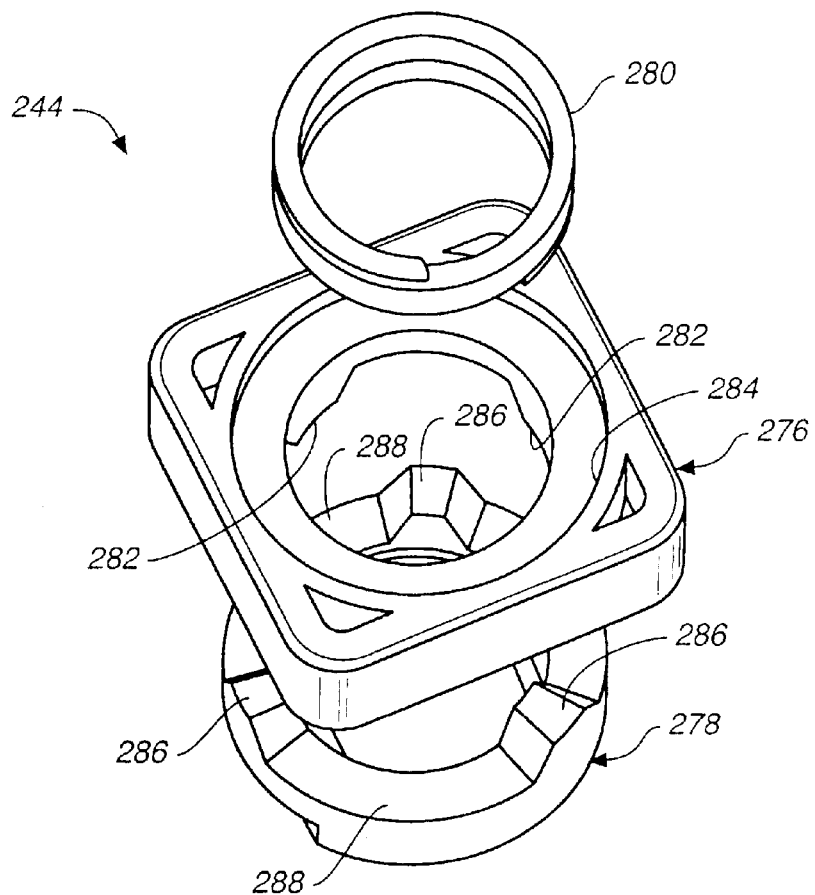
FIG._12A
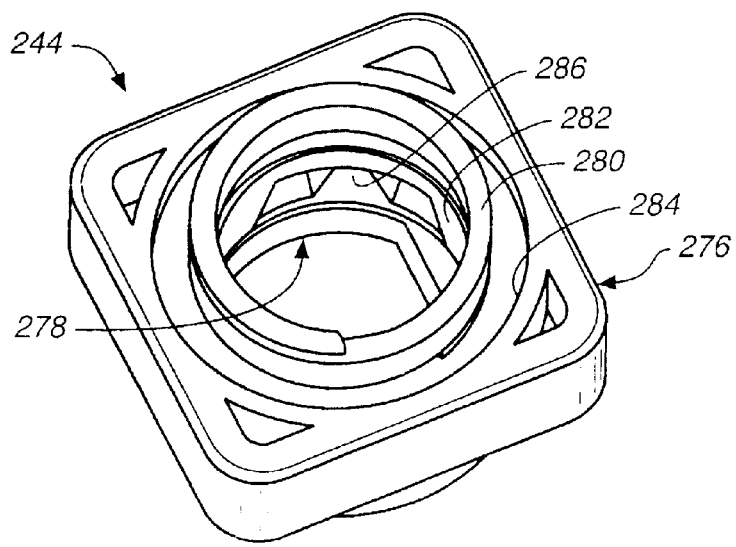
FIG._12B

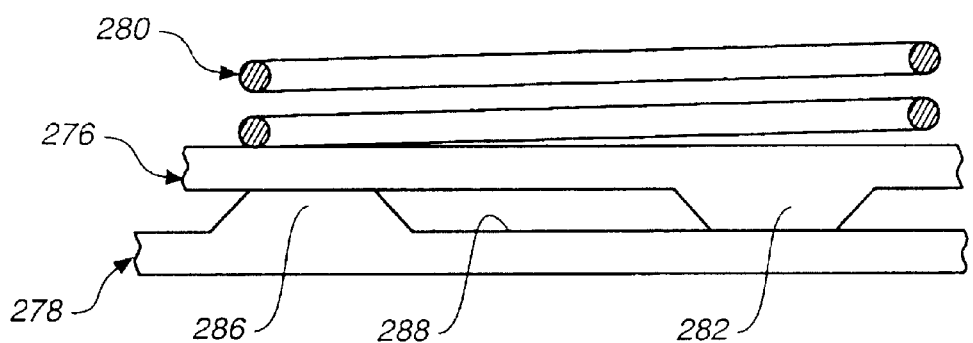
FIG._12C
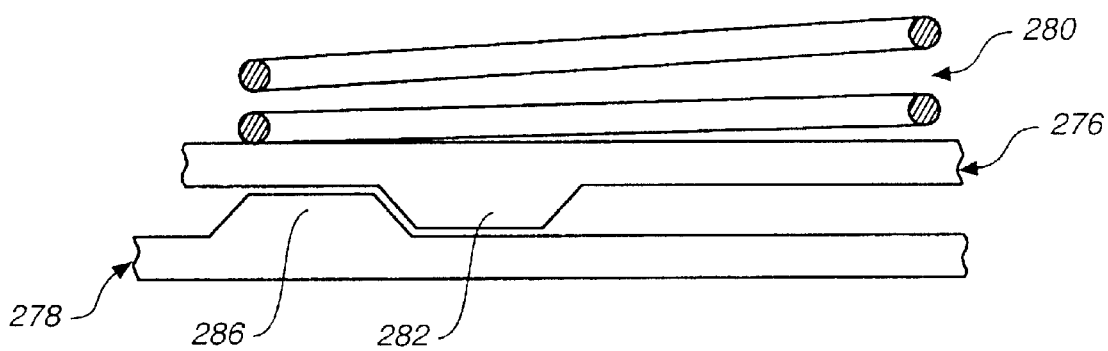
FIG._13C
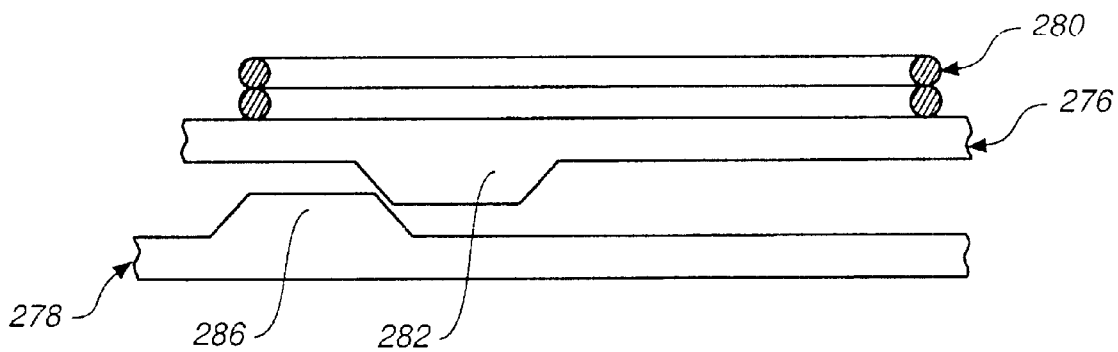
FIG._13D

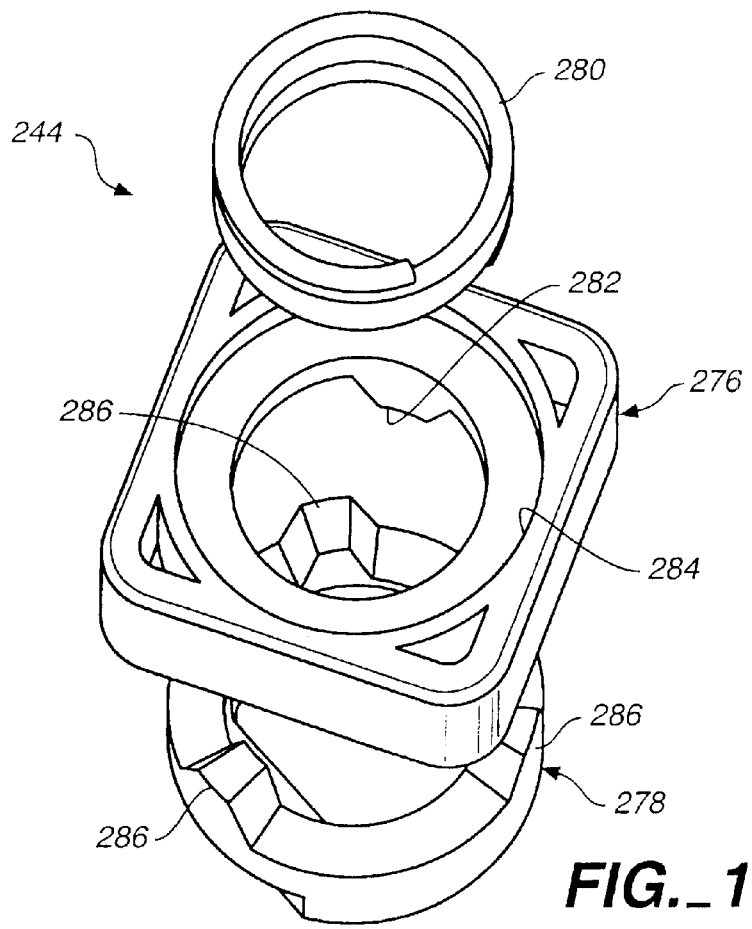
FIG._13A
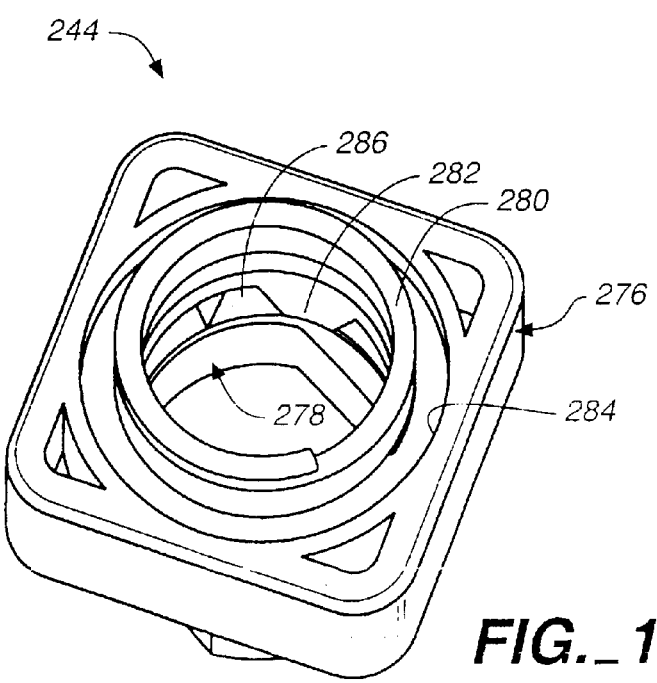
FIG._13B

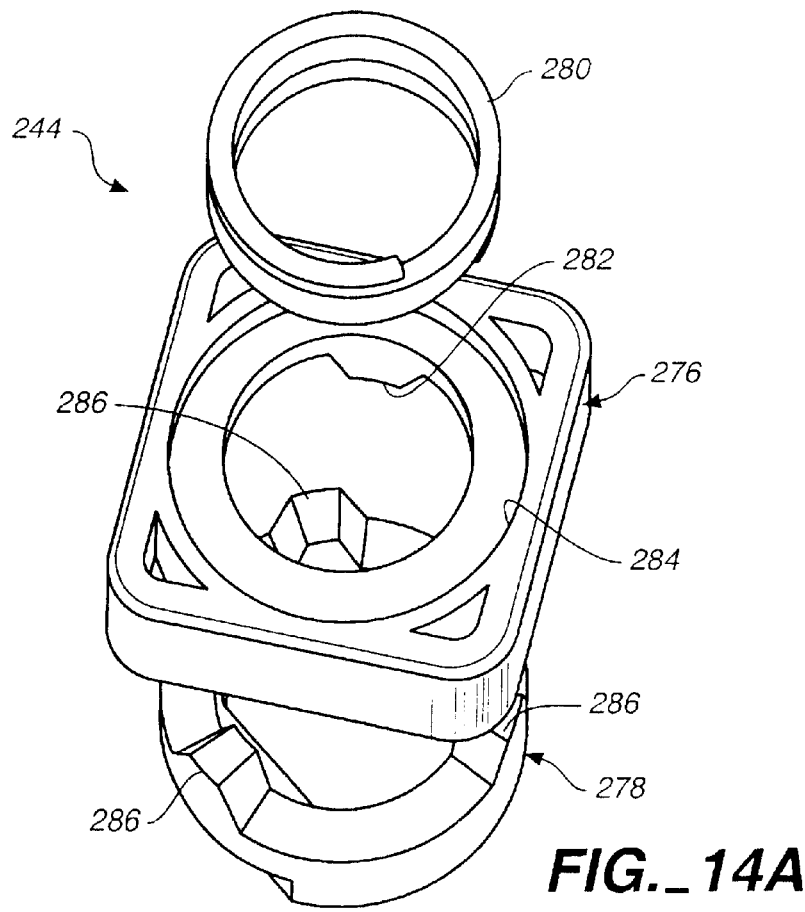
FIG._14A
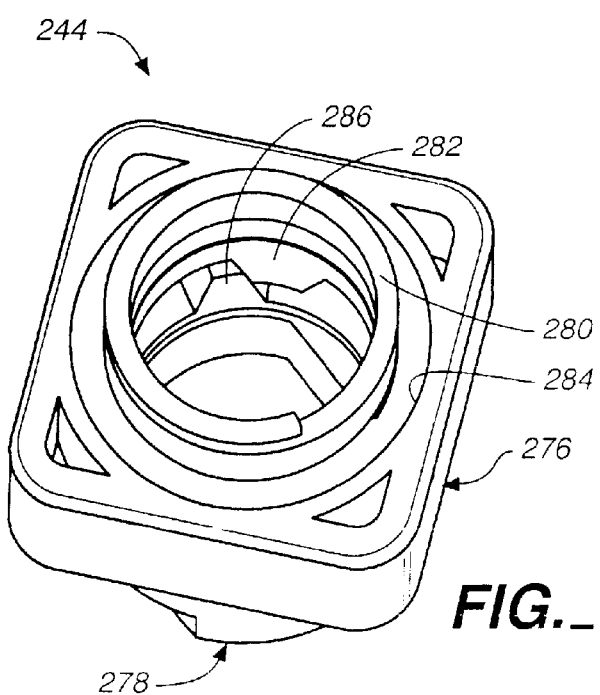
FIG._14B

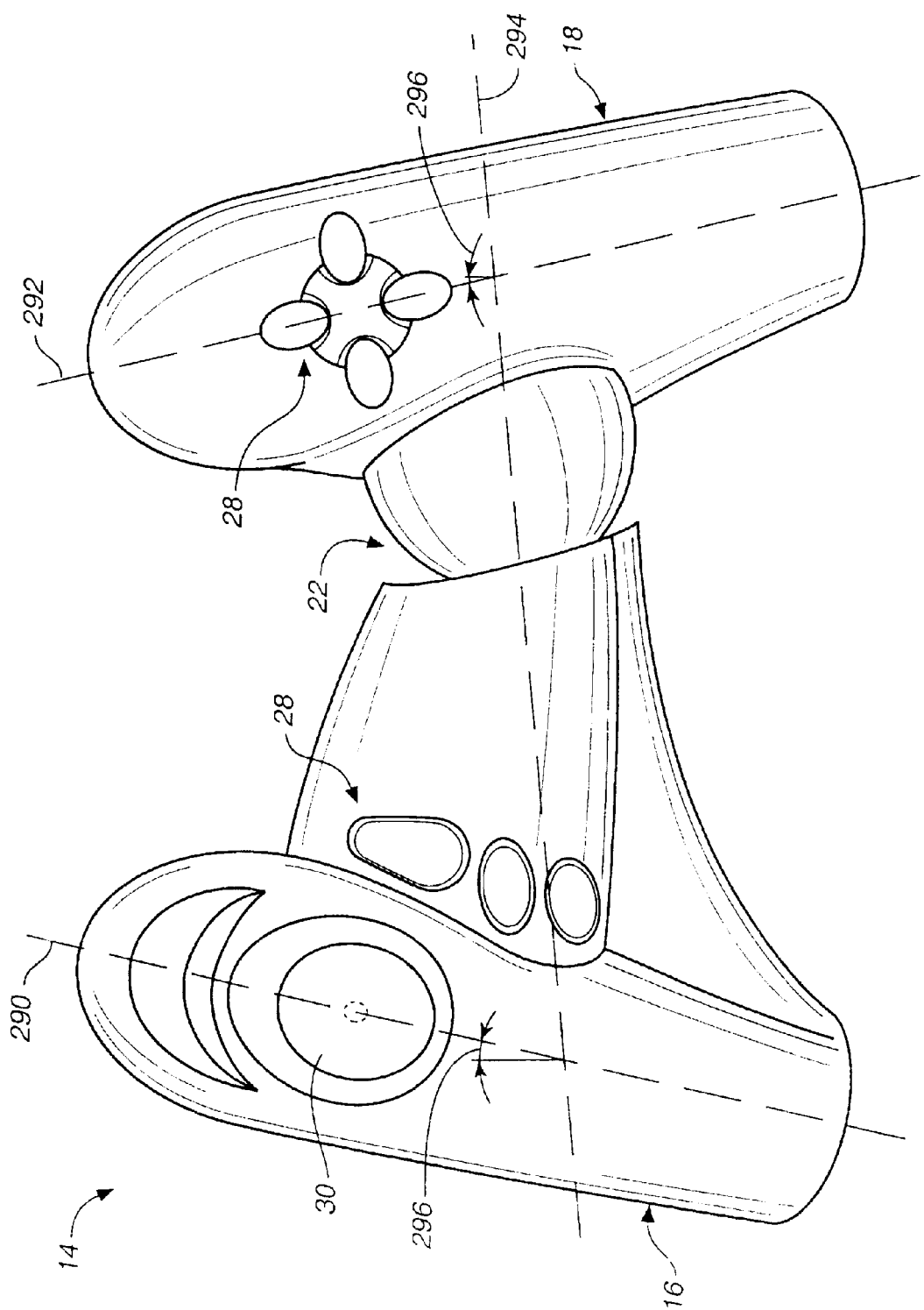
FIG._15A

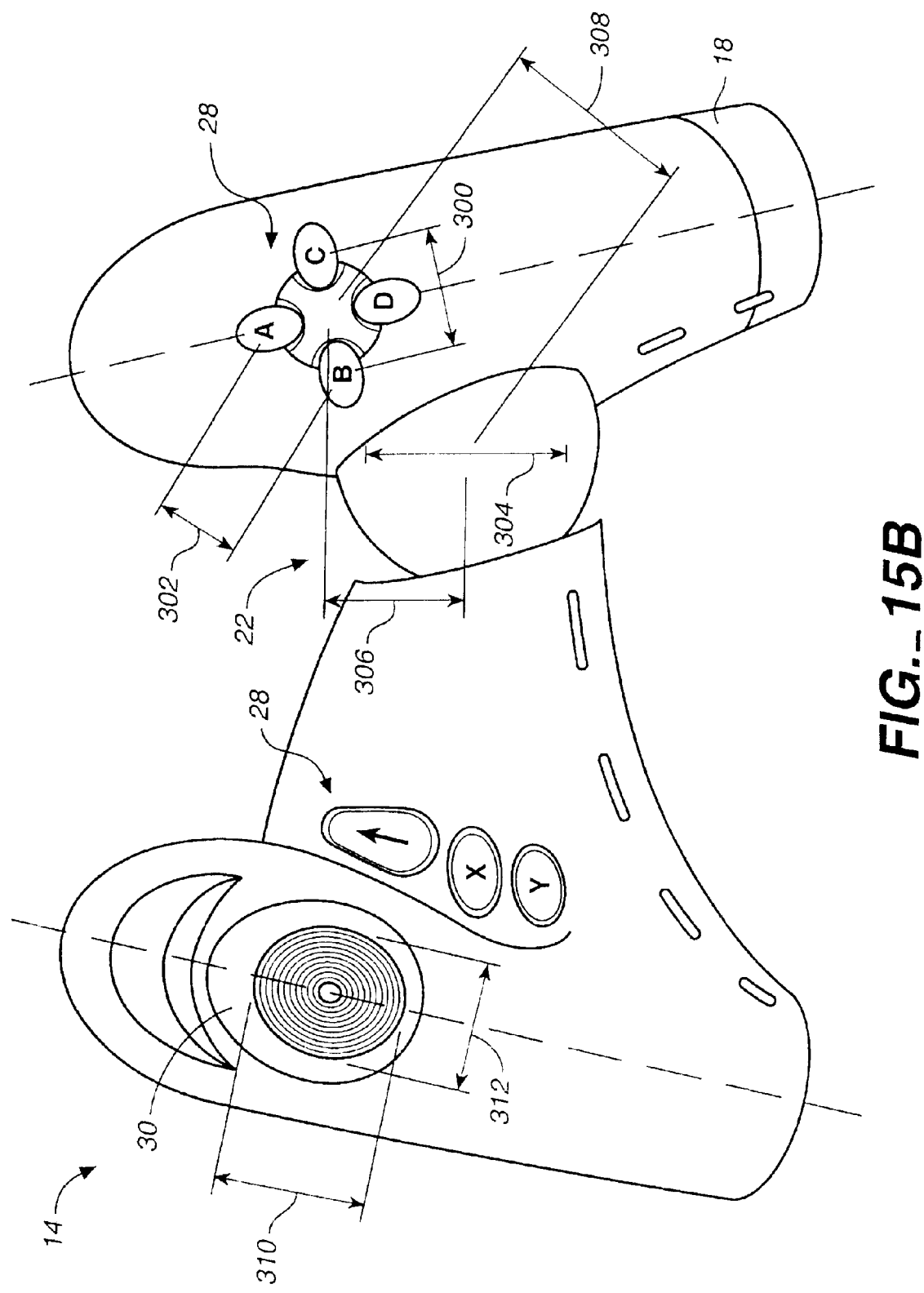
FIG._15B

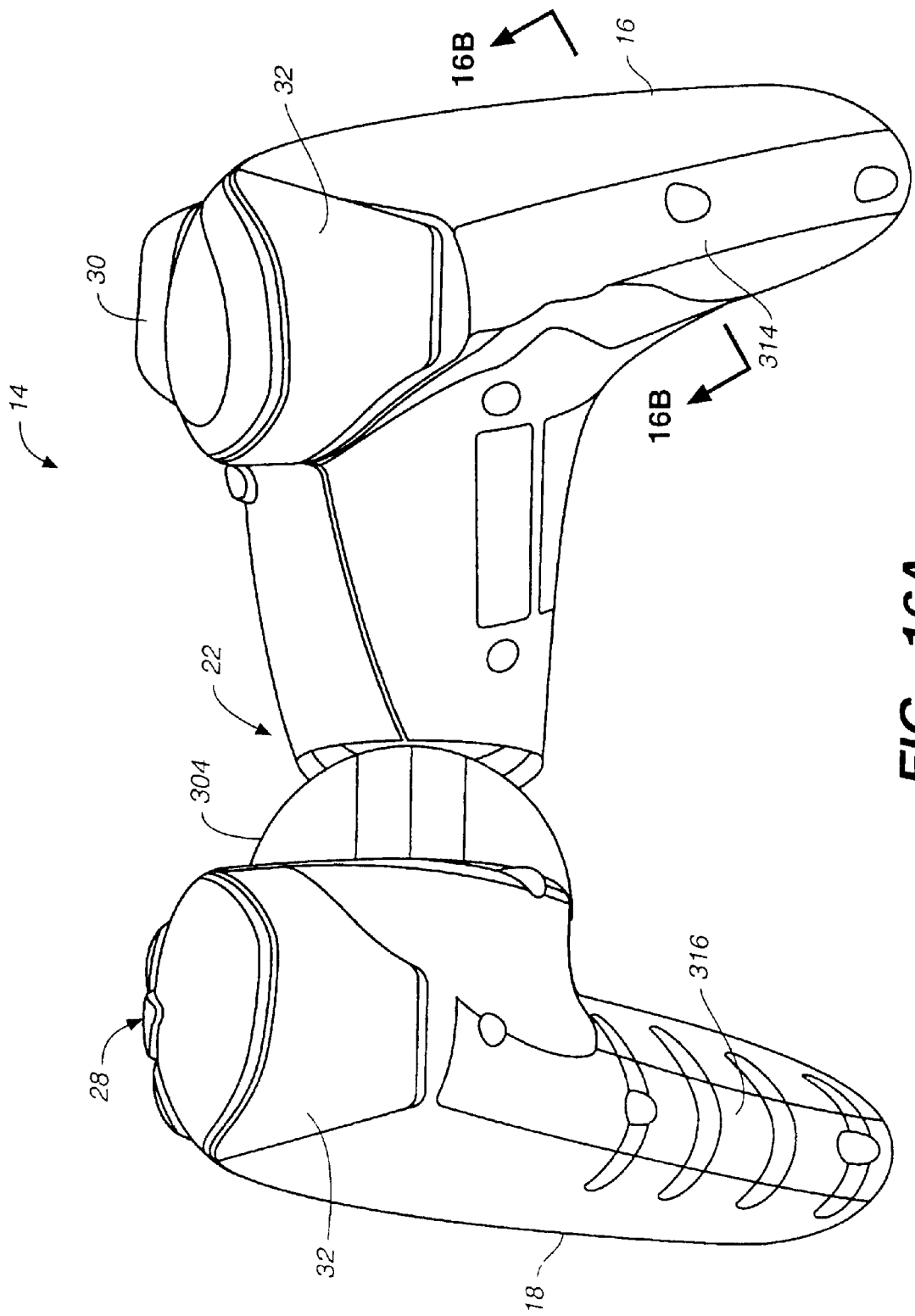
FIG._16A

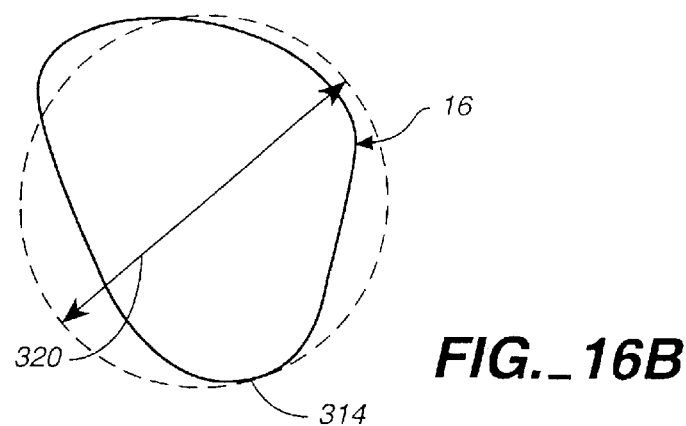
FIG._16B
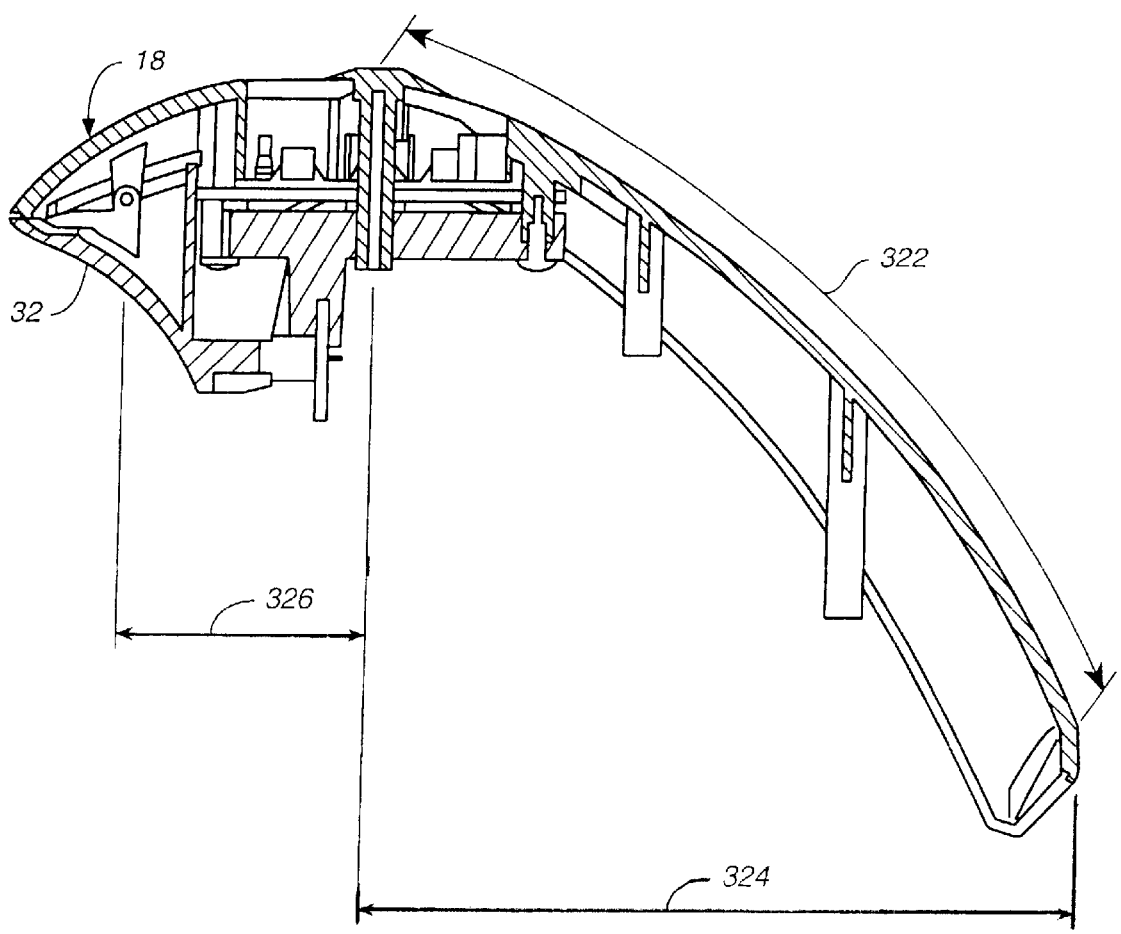
FIG._17

DUAL AXIS ARTICULATED COMPUTER INPUT DEVICE AND METHOD OF OPERATION

REFERENCE TO CO-PENDING APPLICATION

The following patent application is hereby incorporated by reference:

U.S. patent application Ser. No. 29/099,878 filed Jan. 29, 1999 entitled "COMPUTER INPUT DEVICE" and assigned to the same assignee as the present application.

U.S. patent application Ser. No. 09/255,148 filed Feb. 22, 1999 entitled "DUAL AXIS ARTICULATED COMPUTER INPUT DEVICE" and assigned to the same assignee as the present application.

BACKGROUND OF THE INVENTION

The present invention relates to a computer input device. More particularly, the present invention relates to a two-handed computer input device providing dual axis articulated movement.

Many different types of user input devices are currently used for providing user input information to a computer. Such user input devices can include, for example, a point and click device (which is commonly referred to as a computer mouse), a keyboard, a joystick, and a track ball. Such user input devices all typically sense the movement of a movable element relative to a fixed base or housing portion and provide the computer with an input signal indicative of that relative movement.

In addition, some current game applications which run on personal computers or game consoles are first person perspective applications. Such applications offer navigation and pointing capability that is currently achieved (albeit somewhat cumbersomely) through a combination of mouse and keyboard manipulation. The mouse typically controls point of view (up, down, left, right) and the keyboard offers positional movement control (slide left, slide right, forward, backward). The mouse buttons also offer a "fire" for action games and the keyboard offers numerous selection options (weapon selection, door open, zoom in, etc.). Use of the mouse and keyboard in order to control these functions is very difficult and requires a mastery of a relatively non-intuitive combination of finger movements.

It can thus be seen that precision movement, aiming, and action control in a first person perspective three dimensional virtual environment, using current input devices, can be cumbersome. Such games or virtual environments require very fast movement and also require the ability to quickly change directions in order to navigate through maze-like corridors and in order to dodge enemy attacks. Aiming and pointing (which corresponds to looking up or down, left or right through the first person perspective view) are best accomplished with an input device that offers control over a continuous range of movement (as opposed to a discrete button press) such as that available through a mouse or joystick. Position movement control (such as move forward/backward, or slide left/slide right, or elevation) is best accomplished by discrete keystrokes such as that offered by certain switch configurations commonly found on joysticks, or buttons of the keyboards, or other devices.

In addition, some types of user input devices assign more than two degrees of freedom to a single input mode. For example, a joystick which can be pushed along an X axis, and a Y axis has two degrees of freedom, while a joystick which can be pushed along an X and Y axis and which also can be rotated about its longitudinal axis to provide an input to the computer has three degrees of freedom. It has been found that this type of user input device (one which provides more than two degrees of freedom per input mode) can exhibit a high degree of cross-axis interference.

Cross-axis interference can be characterized by a user unintentionally actuating one degree of freedom while trying to actuate a separate degree of freedom. In other words, it is very difficult to prevent translational movement (moving a joystick along the X or Y axis) while attempting to perform a rotational movement (attempting to rotate the joystick about its longitudinal axis). Such interference between these degrees of freedom is cross-axis interference. It is believed that the tendency toward cross-axis interference increases quadratically with each added degree of freedom to any given input mode.

In addition to mice and keyboards, there are other types of conventional input devices used with gaming applications. One such conventional device used for gaming applications is a game pad. However, this device does not lend itself well to the maneuvering required for the first person perspective games. In standard direction pad and button only gamepads, there is no way to input continuous movement. Using game pads with small thumbsticks (a joystick for the thumb) continuous input is possible but the thumbstick is not positioned for intuitive movement, and the user must battle against the thumbstick's return-to-center force which makes precision aiming difficult. The thumbstick is also fatiguing to the small muscle groups in the hand and thumb.

Joysticks employ arm and wrist muscles which do not offer the fine motor control capability of smaller muscle groups. Common joystick configurations also have continuous movement apparatus (the joystick) and discrete movement apparatus (a hatswitch) which must be actuated by the same hand. This makes it difficult to precisely control such movements. In addition, both the joystick and hatswitch include return-to-center spring forces which interfere with precision aiming.

Another input device is sold under the tradename Space Orb 360. This device offers six degrees of freedom which are manipulated by a single hand. This makes the device extremely difficult to use, without extensive training or an innate biomechanical capability to isolate one or two axes from the others which are controlled by the device.

Similarly, a device sold under the tradename Cyberman II offers six degrees of freedom to be manipulated by a single hand. This input device encounters the same difficulties as that described in the preceding paragraph.

Another input device is sold under the tradename Wingman Warrior. This device is a joystick with a free spinning knob for rotation only. The device does not address many fundamentals necessary to succeed in a first person perspective environment.

SUMMARY OF THE INVENTION

The present invention provides a dual axis articulated computer input device. Position sensors are configured to provide position information indicative of a position of two members relative to one another.

In one embodiment, the members are handles and one of the handles represent a first person perspective view on a display device. The handles are movable relative to one another through a plurality of behavioral zones which affect a display on the display device differently. In one embodiment, movement through a first behavioral zones causes absolute movement of the first person perspective view on the display device. Movement through a second behavioral zone causes the first person perspective to move continuously rather than in an absolute fashion.

In another embodiment, tactile feedback is provided to a user as the user transitions between zones. The tactile feedback can, illustratively, be a change in resistance to movement.

The present invention also provides an input device with ergonomic advantages. Shapes and ranges of motion are provided which serve to reduce fatigue. In addition, data structures are provided which are used to transmit position information to a computer. The data structures are formed and processed using advantageous methods and apparatus.

BRIEF DESCRIPTION OF THE DRAWINGS

FIG. 1 is a block diagram of a computer system in which the input device in accordance with the present invention can be utilized.

FIG. 2 is a block diagram of one embodiment of a computer which can be used with the input device in accordance with the present invention.

FIGS. 3A–3C illustrate absolute position sensing in accordance with one aspect of the present invention.

FIG. 4A is a graph illustrating absolute and velocity control in accordance with one aspect of the present invention.

FIG. 4B illustrates an absolute zone and a velocity zone in accordance with one aspect of the present invention.

FIG. 5 is a high level functional block diagram of an input device in accordance with one aspect of the present invention.

FIG. 6 illustrates one embodiment of an information packet generated by the input device illustrated in FIG. 5.

FIG. 7 is a flow diagram illustrating the operation of the input device shown in FIG. 5 in generating an information packet.

FIG. 8 is a functional block diagram illustrating the processing of an information packet in accordance with one aspect of the present invention.

FIGS. 9A–9C are flow diagrams illustrating the processing of an information packet in accordance with one aspect of the present invention.

FIG. 10 is an exploded view of an input device in accordance with one embodiment of the present invention.

FIG. 11 is an enlarged view of a portion of the input device shown in FIG. 10.

FIGS. 12A–14B illustrate a cam arrangement in accordance with one aspect of the present invention.

FIGS. 15–17 illustrate certain ergonomic features in accordance with one aspect of the present invention.

DETAILED DESCRIPTION OF THE ILLUSTRATIVE EMBODIMENTS

FIG. 1 is a partial block and partial pictorial diagram of system 10 in accordance with one aspect of the present invention. System 10 includes input device 14, computer display device 15 and computer 20.

It should be noted that, in one illustrative embodiment, device 14 can be implemented as any input device (such as a joystick), with a handle, or portion thereof, movable relative to another portion thereof. However, for, purposes of simplicity, the present discussion proceeds with respect to the illustrative embodiment of device 14 illustrated in FIG. 1.

Computer input device 14, in accordance with one aspect of the present invention, is provided with first and second handle members 16 and 18, respectively. Members 16 and 18 are sized to fit within the hand of the user and are movable relative to one another. In one illustrative embodiment, members 16 and 18 are connected by a linkage generally illustrated at 22. Linkage 22 allows member 18 to be articulated relative to member 16 in a yaw direction (or side to side along an X-axis) generally indicated by arrow 24. Linkage 22 also illustratively allows member 18 to be pivoted in a pitch direction (or up and down along a Y-axis) in a direction generally indicated by arrow 26. This motion, and linkage 22, is described in greater detail later in the specification. In addition, computer input device 14 illustratively includes position sensors which sense the position of member 18 relative to member 16.

In accordance with one illustrative embodiment of the present invention, computer input device 14 is also provided with an array of buttons 28. In one illustrative embodiment, array 28 includes four buttons on member 18 and three additional buttons (including a shift key) on member 16. Further, computer input device 14 is provided with a multiple switch input device 30 (such as a direction pad or hatswitch), and one or more triggers 32. FIG. 1 also illustrates that members 16 and 18 of computer input device 14 also may include elongate handle portions 34 and 36 which extend downwardly and away from the button array 28 and are sized to fit comfortably within the hand of the user.

Computer input device 14 includes a controller which receives information indicative of the various buttons, triggers and multi-switch input devices, as well as from the position sensors, and generates an information packet indicative of that information. The information packet is provided to computer 20 (one embodiment of which is described in greater detail in FIG. 2). Computer 20 illustratively includes an application program, such as a game or other program which utilizes the information in the packet from input device 14. Computer 20 operates to provide the information in the packet from input device 14 to the application program running on computer 20, which uses the information to manipulate an object being displayed on display device 15. In an illustrative embodiment, computer 20 is a personal computer, and display device 15 may be any type of display such as a CRT-type monitor (including television displays, LCD displays, plasma displays, and so forth). In alternative embodiments, computer 20 may also be a dedicated computer, such as one of the many dedicated gaming computers manufactured by Nintendo, Sega, Sony and others, or a dedicated simulation or control computer. Some such computers are sold under the designations Sega Dreamcast and Sony Playstation.

Of course, the information packet provided by computer input device 14 to computer 20 can be used by computer 20 (and the application program running thereon) to control other items, other than a display device 15. However, the present invention will be described primarily with respect to controlling display device 15, for the sake of clarity.

With reference to FIG. 2, an exemplary environment for the invention includes a general purpose computing device in the form of conventional personal computer 20, including processing unit 38, a system memory 39, and a system bus 40 that couples various system components including the system memory to the processing unit 38. The system bus 40 may be any of several types of bus structures including a memory bus or memory controller, a peripheral bus, and a local bus using any of a variety of bus architectures. The system memory includes read only memory (ROM) 41 a random access memory (RAM) 42. A basic input/output system 43 (BIOS), containing the basic routine that helps to transfer information between elements within the personal computer 20, such as during start-up, is stored in ROM 41. The personal computer 20 further includes a hard disk drive 44 for reading from and writing to a hard disk (not shown), a magnetic disk drive 45 for reading from or writing to removable magnetic disk 46, and an optical disk drive 47 for reading from or writing to a removable optical disk 48 such as a CD ROM or other optical media. The hard disk drive 44, magnetic disk drive 45, and optical disk drive 47 are connected to the system bus 40 by a hard disk drive interface 49, magnetic disk drive interface 50, and an optical drive interface 51, respectively. The drives and the associated computer-readable media provide nonvolatile storage of computer readable instructions, data structures, program modules and other data for the personal computer 20.

Although the exemplary environment described herein employs a hard disk, a removable magnetic disk 46 and a removable optical disk 48, it should be appreciated by those skilled in the art that other types of computer readable media which can store data that is accessible by a computer, such as magnetic cassettes, flash memory cards, digital video disks, Bernoulli cartridges, random access memories (RAMs) read only memory (ROM), and the like, may also be used in the exemplary operating environment.

A number of program modules may be stored on the hard disk, magnetic disk 46, optical disk 48, ROM 41 or RAM 42, including an operating system 52, one or more application programs 53, other program modules 54, and program data 55. A user may enter commands and information into the personal computer 20 through input devices such as a keyboard 56 and pointing device 57. Other input devices (not shown) may include a microphone, joystick, game pad, satellite dish, scanner, or the like. These and other input devices are often connected to the processing unit 38 through an interface 58 that is coupled to the system bus 40. Interface 58 can include a number of different interfaces, such as a sound card, a parallel port, a game port or a universal serial bus (USB) The monitor 16 or other type of display device is also connected to the system bus 40 via an interface, such as a video adapter 59. In addition to the monitor 16, personal computers may typically include other peripheral output devices such as speakers and printers (not shown).

The personal computer 20 may operate in a networked environment using logic connections to one or more remote computers, such as a remote computer 60. The remote computer 60 may be another personal computer, a server, a router, a network PC, a peer device or other network node, and typically includes many or all of the elements described above relative to the personal computer 20, although only a memory storage device 61 has been illustrated in FIG. 2. The logic connections depicted in FIG. 2 include a local are network (LAN) 62 and a wide area network (WAN) 63. Such networking environments are commonplace in offices, enterprise-wide computer network intranets and the Internet.

When used in a LAN networking environment, the personal computer 20 is connected to the local area network 62 through a network interface or adapter 64. When used in a WAN networking environment, the personal computer 20 typically includes a modem 65 or other means for establishing communications over the wide area network 63, such as the Internet. The modem 65, which may be internal or external, is connected to the system bus 40 via the serial port interface 58. In a network environment, program modules depicted relative to the personal computer 20, or portions thereof, may be stored in the remote memory storage devices. It will be appreciated that the network connections shown are exemplary and other means of establishing a communications link between the computers may be used.

When computer 20 is a dedicated computer, the specific architecture may differ from that illustrated in FIG. 2. The differences, however, are of no great consequence. All such computers contain a mechanism for executing computer software and/or hardware that receives information from input device 14 and utilizes the information received to modify the behavior or appearance of software and/or hardware. Often this results in a change that is visible on a display device.

FIGS. 3A–3C illustrate position sensing in accordance with one aspect of the present invention. In FIG. 3A, computer input device 14 is shown relative to a display 100 on display device 15. FIG. 3A illustrates that display 100 is only a portion of a 3D virtual environment which can be displayed on display device 15. With member 18 in a substantially central position relative to member 16, along both the X and Y rotational axes, the portion of the three dimensional virtual environment being displayed is a central portion of the first person perspective view as illustrated in FIG. 3A.

However, FIG. 3B shows a top view of computer input device 14 illustrating that member 18 can be pivoted in the X direction indicated by arrow 24, relative to member 16, and generally about an axis of rotation 102. If device 14 is implemented as a joystick, pivoting about axis 102 may correspond, for example, to movement of the joystick in a side-to-side fashion. As member 18 is pivoted about axis 102 within a certain, predetermined range of motion, computer input device 14 forms the information packet including information indicative of the relative position of member 18, relative to member 16, about axis 102. This information can be used by computer 20 (and an application running thereon) to control the point of view being displayed on display device 15.

For example, as member 18 is rotated about axis 102 within the predetermined range of motion, the point of view may illustratively be correspondingly shifted in the direction indicated by arrow 104 in FIG. 3B. As member 18 is articulated counter clockwise about axis 102, the point of view can be shifted toward the position indicated by numeral 100A in FIG. 3B. Similarly, as member 18 is articulated in the clockwise direction about axis 102, the point of view can be shifted toward the position 100B illustrated in FIG. 3B. In this way, absolute movement of member 18 relative to member 16 is directly mapped to absolute movement of the point of view being displayed, as illustrated in FIG. 3B. Of course, this same type of mapping can be accomplished when device 14 is implemented in another way, such as a joystick.

FIG. 3C illustrates a side view of computer input device 14. FIG. 3C illustrates that, in one illustrative embodiment, member 18 of computer device 14 is not only articulable about axis 102 (shown in FIG. 3B), but can also be rotated about axis 106, in the pitch or Y direction indicated by arrow 26. When device 14 is a joystick, rotation about axis 106 may correspond to movement of the joystick in a front-to-back (or back-to-front) fashion. As member 18 is pitched in the direction indicated by arrow 26, so long as it stays within the predetermined range of motion, the first person perspective displayed on display device 15 is correspondingly moved in the direction indicated by arrow 108. For example, as member 18 is rotated in a counter clockwise direction (with reference to FIG. 3) the first person perspective shifts upwardly toward the position designated by numeral 100C in FIG. 3C. Similarly, as member 18 is rotated about axis 106 in a clockwise direction (again with reference to FIG. 3C) the first person perspective displayed on display device 15 is shifted downwardly, such as toward the position designated generally by numeral 100D. Thus, so long as member 18 is rotated about axis 106 within the predetermined range of motion, absolute movement of member 18 relative to member 16 can be mapped to absolute movement of the first person perspective displayed on display device 15. This same type of mapping can be done when device 14 is implemented as, for example, a joystick.

Of course, the absolute movement of member 18 relative to member 16, about either axis 102 or 106, can either be directly mapped, or can be scaled upwardly or downwardly to provide absolute movement of the first person perspective displayed on display device 15. For instance, five degrees of rotation of member 18 about either axis 102 or 106 may correspond to 20 degrees of rotation of the first person perspective view in the virtual environment being displayed on display device 15. Any desirable scaling factor (including 1:1) can be used.

If member 18 is moved beyond the predetermined range of motion about either axis 102 or 106 (or if the joystick is moved side-to-side or forward or backward beyond the predetermined range of motion), such movement is no longer mapped to absolute movement or absolute position of the first person perspective view being displayed on display device 15. Instead, that movement illustratively corresponds to a continuous movement of the first person perspective view. For example, if member 18 is articulated about axis 102 in the direction indicated by arrow 24 (shown in FIG. 3B) by an amount which exceeds the predetermined range of motion, then the first person perspective view will appear to continuously spin in the direction of movement of member 18, until member 18 is brought back within the predetermined range of motion. This is illustrated in greater detail in FIGS. 4A and 4B.

FIG. 4A illustrates a range of motion (in degrees rotation) about either axis 102 or 106, plotted against the physical force opposing such rotation which is felt by the user, in one illustrative embodiment. The range of motion is shown divided into three different ranges or behavior zones 110, 112 and 114, although more or fewer zones with different profiles can be used as well. As the user rotates member 18 within range 110 (which in one illustrative embodiment is about + or −30 degrees relative to a centered, neutral position, but any desired range may be used, and the range may be asymmetric about the neutral position, if desired) the user illustratively perceives a viscous fluid motion, with light, constant resistance to movement throughout the entire zone 110. However, a return to center force may also be provided in zone 110. As soon as the user rotates member 118, in either direction, beyond the boundaries of zone 110, the user illustratively encounters a different resistance to movement, such as increasing force. Therefore, as the user rotates member 118 beyond about the +30 degree range of motion, and into range 112, for instance, the user encounters increasing physical resistance to movement as the user continues. to rotate member 118 through its full positive range of motion (e.g., to about +40 degrees). Similarly, as the user rotates member 118 beyond about −30 degrees from neutral, and into zone 114, the user encounters increasing resistance to continued rotation through zone 114 through its complete range of motion (e.g., to about −40 degrees). It should also be noted that any or all zones may be configured with a return to center force as well. Further, other non-linear or stepped force profiles can be also be used in any or all of the zones. The force may increase and then decrease within any zone. Also, the central zone 110 need not exhibit a constant force profile. A linear, ever increasing force profile is shown in the outer zones and a linear, constant force profile is shown in the central zone for illustrative purposes only.

In one illustrative embodiment, the force profile illustrated in FIG. 4A is accomplished using a cam and cam follower arrangement which is illustrated in greater detail in FIGS. 12A–14B, discussed below. However, any other arrangement can be used which accomplishes the desired force profile. For example, compression or extension springs, fluid filled dashpots, pneumatic or hydraulic systems, air-over-hydraulic systems, or other varying resistance assemblies or bias members can be used.

FIG. 4B illustrates different behavioral zones (e.g., absolute and velocity zones of movement) in accordance with one aspect of the present invention. FIG. 4B will be described in conjunction with FIG. 4A and FIGS. 3A–3C. FIG. 4B is a plot of pitch movement (or Y-axis movement) of member 118 about axis 106, and yaw movement (or X-axis movement) of member 18 about axis 102. The plot in FIG. 4B is divided into three control bands or behavioral zones 116, 118, and 120, respectively. Although more or fewer behavioral zones can be used as well. The behavioral zones are plotted against axes which represent pitch movement (Y-axis movement) of member 18 about axis 106 and yaw movement (X-axis movement) of member 18 about axis 102 when device 14 is a joystick, such behavioral zones correspond to forward/backward and side-to-side movement of the joystick, respectively.

Behavioral zone 116 is a central band which generally represents the neutral or centered position within the range of motion of member 18 with respect to member 16. It should be noted that central control band 116 may be represented by only a single point or a small group of points in FIG. 4B, or by a large group of points. Behavioral zone 118 is an absolute positioning control band which corresponds to the predetermined range of motion 110 about axis 102 and 106. Behavioral zone 120 represents a velocity control band corresponding to movement of member 18 in either direction beyond the predetermined range of motion 110.

While the control bands can behave in a similar fashion with respect to rotation of member 18 about either axis 102 or 106, the present discussion will proceed only with respect to rotation of member 18 about axis 102, for the sake of simplicity. As the user moves member 18 relative to member 16 about axis 102, within zone 118, device 14 provides information to computer 20 indicative of the relative position of members 16 and 18, and, in the embodiment in which display device 15 is displaying a virtual environment for a game, computer 20 causes the first person perspective view to shift in an absolute fashion, either left or right, in the same direction as rotation of member 18 about axis 102. Therefore, if the user rotates member 18, for example, +5 degrees about axis 102, relative to center band 116, computer 20 causes the first person perspective view to shift a predetermined distance to the right, as illustrated in FIG. 3B. It should be noted that 5 degrees of movement of member 18 can correspond to either the same amount of movement of the first person perspective view, or a different amount of movement. However, the absolute movement of member 18 is illustratively directly mapped to absolute movement of the first person perspective view.

When movement of member 18 about axis 102 exits behavioral zone 118 and enters behavioral zone 120, absolute movement of member 18 is no longer mapped to absolute movement of the first person perspective view. Instead, movement of member 18 within zone 120 establishes a continuous movement of the first person perspective view in a direction corresponding to the direction of rotation of member 18 about axis 102. In other words, if the user rotates member 18 in a clockwise direction about axis 102 into zone 120, the first person perspective view illustrated in FIG. 3B will begin spinning to the right. So long as the user holds member 18 in a fixed position within zone 120, the first person perspective view will continue to spin to the right at a constant velocity.

In one illustrative embodiment, zone 120 is divided into a plurality of sub-control bands. Therefore, as the user rotates member 18 about axis 102 further into zone 120, member 18 moves through the sub-control bands and the first person perspective view will spin at a higher velocity in each zone. Thus, the velocity profile through zone 120 increases in a step wise fashion as member 18 is moved through the sub-control bands. Similarly, in an alternate embodiment, the velocity profile of zone 120 can be represented by a linear, increasing function or a non-linear increasing (e.g., exponential or quadratic) function or a linear or non-linear function which is not continuously increasing, but increases at first, then levels or decreases. The shape of the velocity profile may also be selectable or adjustable by the user. In that case, the user may be provided an opportunity to select from among a variety of different predetermined profiles or to customize the profile by specifying a profile shape.

It will be appreciated that, as the user rotates member 18 further into zone 120, the user is also illustratively encountering increased physical resistance to rotation about the axis in the device, as illustrated by range of motion 112, in the force profile illustrated in FIG. 4A. Thus, the higher velocity is intuitively coupled with the increasing physical resistance to give the user tactile feedback as to the velocity corresponding to a given rotation into the velocity zone. Of course, it should again be mentioned that other force profiles (e.g., steeper or shallower inclines, non-linear, stepped, etc.) can also be used for the zones. In those cases, the tactile feedback (force profile) may or may not be configured to generally match the velocity profile.

As the user begins rotating member 18 in a counter clockwise direction about axis 102, back toward the boundary between behavioral zones 118 and 120, the velocity at which the first person perspective view is spinning follows the velocity profile in that direction. Thus, in the embodiment illustrated, the velocity at which the first person perspective view is spinning decreases. The transition from zone 120 back into zone 118 can be handled in a number of different ways. For instance, it may be desirable to have member 18 placed in the center or neutral position 116, upon exiting control band 120, before absolute positioning is resumed. In that case, as the user rotates member 18 counter clockwise about axis 102, the boundary between zones 118 and 120 can be moved to be coincident with the boundary between zones 118 and 116. The first person perspective view will thus continue to spin at a decreasing velocity until member 18 is rotated about axis 102 all the way to the boundary of central zone 116. Then, the boundary between zones 120 and 118 is re-established at its original position (shown in FIG. 4B) and the user can resume absolute positioning within zone 118, as discussed above.

In another illustrative embodiment, the transition from zone 120 to zone 118 is handled in a different manner. In that embodiment, as the user rotates member 18 counter clockwise and crosses the boundary of zone 118, the user simply encounters a dead zone, in which no movement of the first person perspective view is perceived until the user continues rotating member 18 counter clockwise to within central zone 116. In other words, as the user rotates member 18 counter clockwise about axis 102 past the boundary of zone 120, into zone 118, the first person perspective view will stop spinning, and will not move at all even though the user continues to rotate member 18 through zone 118 toward central zone 116. Once the user has recentered member 18 to be within zone 116, normal positioning is resumed.

Further, in an alternate embodiment, member 18 need not be centered within zone 118 for control to switch. In other words, as soon as member 18 is returned from zone 120 to zone 118, absolute movement control is resumed. Also, the boundary at which this occurs can be set at substantially any desirable point along the range of motion. It should also be noted that this point may be selectable or adjustable by the user.

FIG. 5 is a block diagram of one embodiment of user input device 14. FIG. 5 illustrates that user input device 14 includes controller 124, X and Y position sensors 126 and 128, calibration circuitry 130, button array switches, trigger switches and the switches corresponding to multi-switch input device 30 (all collectively designated by numeral 132) and zone calibration circuitry 134.

X and Y sensors 126 and 128 may be rotational potentiometers. Of course, sensors 126 and 128 can be other types of sensors, such as optical or mechanical encoders, capacitive sensors, electromagnetic sensors, etc. Where sensors 126 and 128 are potentiometers, sensor 126 illustratively has a resistive portion coupled to member 16 and a wiper portion coupled to member 18 (or vice versa). Therefore, as member 18 is rotated about pitch axis 106, the resistive value of the potentiometer which embodies sensor 126 changes. Similarly, sensor 128 illustratively has a resistive portion coupled to member 16 and a wiper portion coupled to member 18 (or vice versa). Therefore, as member 18 is rotated about axis 102, the resistive value of the potentiometer which embodies sensor 128 changes. In this manner, sensors 126 and 128 provide a signal indicative of the X and Y (pitch and yaw) position of member 18 relative to member 16.

Similarly, when device 14 is a joystick, sensors 126 and 128 can be any conventional sensor arrangement used for sensing side-to-side and forward/back movement of the joystick. One such arrangement is set out in U.S. Pat. No. 5,694,153, which is hereby fully incorporated by reference.

The signal from sensors 126 and 128 is provided to an analog-to-digital (A/D) converter 136. In the illustrative embodiment, converter 136 is integral with microcontroller 124. Of course, other discrete A/D converters can be used as well. A/D converter 136 converts the analog sensor signals from sensors 126 and 128 into digital signals which are provided to microcontroller 124.

In order to calibrate sensors 126 and 128, computer input device 14 is illustratively placed in a test fixture which can be manipulated to rotate member 18 to precisely known angles relative to member 16. When in the precisely known angles, the values output by sensors 126 and 128 are set (such as trimmed) to desired values using sensor calibration circuit 130. In one illustrative embodiment, circuit 130 is a circuit of trim potentiometers arranged to trim the output values of sensors 126 and 128. Other calibration circuits, either hardware of software can be used as well. Some examples include physically re-orienting an optical encoder, programming programmable power supplies or providing a digital offset once the signal is converted to digital form.

The switches 132 for the button array, triggers, and hatswitch, in one illustrative embodiment, simply comprise an array of switches which provide signals indicative of their closure to microcontroller 124. Therefore, as any of the buttons in array 28 or triggers 32, or the buttons associated with hatswitch 30, are depressed, those buttons and triggers cause a switch closure which is sensed by microcontroller 124.

Zone calibration circuitry 134 is used to set (such as to trim or otherwise accurately set) the zone boundaries between the absolute positioning zone and the velocity positioning zone (described with respect to behavioral zones 118 and 120 illustrated in FIG. 4B). For ergonomic or other reasons, it may be desirable to have the full range of motion about both the X and Y axes to be a maximum of approximately +/−40 degrees. In that case, the outputs of sensors 126 and 128 are adjusted such that the maximum signal output by the sensors corresponds to the maximum range of motion (or travel) of member 18 relative to member 16 about the appropriate axes.

Similarly, it may be desirable to accurately calibrate the transition between zone 118 (the absolute position zone) and zone 120 (the velocity position zone) such that the transition between the zones directly corresponds to the user's perception of increased force (as illustrated by the force profile shown in FIG. 4A). Therefore, member 18 is rotated to the boundary position at which the perceived increased force is exhibited, and the value then being outputs by sensors 126 and 128 are set to a desired value. This can be accomplished by placing computer input device 14 in the text fixture which is fitted with strain gauges, or other strain measuring devices, such that the text fixture can identify when the user input device has reached the transition between the absolute positioning zone and the velocity positioning zone. As with sensor calibration circuit 130, zone calibration circuit 134 can be implemented with trim potentiometers arranged to trim the output of sensors 126 and 128 to desired levels. Of course, alternate calibration (either hardware or software) can be used as well. For example, where the sensors are optical encoders, they can be re-oriented. Also, a digital offset can be provided, etc.

Microcontroller 124 is also provided with an output suitable for being coupled to computer 20. In one illustrative embodiment, the output provided by microcontroller 124 is provided according to a universal serial bus (USB) protocol. Similarly, a USB converter cable can be coupled between microcontroller 124 and computer 20 to accommodate the necessary transmission of data. In another illustrative embodiment, the output for microcontroller 124 is provided according to a game port protocol or any other desired protocol.

FIG. 6 illustrates a data packet 136 which is prepared by microcontroller 124 and transmitted to computer 20. While data packet 136 can be transmitted to computer 20 either serially, or in parallel, the substance of data packet 136 is illustrated in FIG. 6 in terms of 5, 8-bit bytes of information. The bytes are labeled byte 0–4 along the left hand column of packet 136, and the bits are labeled bits 0–7 along the top row of packet 136.

The signals from sensors 126 and 128 are converted by A/D converter 136 into a digital word having, illustratively, 10 bit resolution and which is representative of the position of member 18 relative to member 16. of course, 8 bit resolution or any other desired resolution can be used as well. The 10 bit resolution data is represented by bits X0–X9 (for sensor 128) and bits Y0–Y9 (for sensor 126). This information is included in packet 136 beginning with byte 0, bit position 0 and ending with byte 2, bit position 3.

Based on the values from A/D converter 136, microcontroller 124 can determine whether the user has rotated member 18 into the velocity control zone 120 or whether member 18 is still in the absolute positioning zone 118. The bits ZBX and ZBY located in byte 2, bit positions 4 and 5, respectively, correspond to a determination as to whether member 18 is in the absolute or velocity positioning zones. For example, if the ZBX bit is set to a 0, that corresponds to member 18 being in the absolute positioning zone in the X (or yaw) direction. If that bit is set to a 1, that indicates that member 18 has been rotated about axis 102 beyond the predetermined range of motion, into the velocity zone. The value indicated by bits X0–X9 then indicate whether member 118 is in the velocity zone on the positive or negative side of neutral. The ZBY bit in byte 2 bit position 5 corresponds to rotation of member 18 in the Y direction (or about pitch axis 106) in a similar fashion.

Bit positions 6 and 7 in byte 2 are unused.

Bits B0–B6 residing in byte 3, bit positions 0–6, are indicative of the state of closure of the switches corresponding to the buttons in button array 28. Signals T0 and T1 residing in byte 3, bit location 7 and byte 4 bit location 0, respectively, indicate the state of the closure of switches associated with triggers 32.

Bits 1, 2 and 3 in byte 4 are unused.

In byte 4, bit locations 4–7, values are provided which represent the state of the multiple-switch device 30. In the embodiment illustrated, device 30 is a hatswitch. Therefore, the bits in the associated bit locations are labeled H0–H3. The following table illustrates the position of hatswitch 30 represented by bits H0–H3.

TABLE 1

| H3 | H2 | H1 | H0 | Position |
|---|---|---|---|---|
| 0 | 0 | 0 | 1 | 0 degrees |
| 0 | 0 | 1 | 0 | 45 degrees |
| 0 | 0 | 1 | 1 | 90 degrees |
| 0 | 1 | 0 | 0 | 135 degrees |
| 0 | 1 | 0 | 1 | 180 degrees |
| 0 | 1 | 1 | 0 | 225 degrees |
| 0 | 1 | 1 | 1 | 270 degrees |
| 1 | 0 | 0 | 0 | 315 degrees |
| 0 | 0 | 0 | 0 | No Hatswitch depressed |

FIG. 7 is a flow diagram illustrating the formation of packet 136 by microcontroller 124 shown in FIG. 5. Controller 124 receives and filters the X and Y position information. This is indicated by block 138. In filtering the X and Y position information, controller 124, in one illustrative embodiment, over-samples and smooths the data received from the sensors. That data can be provided to filtering logic implemented in controller 124. The filtering logic may illustratively employ low pass filtering techniques to remove large, or abberational, spikes. Once the data has been received and filtered, it is stored in controller 124 (or associated memory) for later creation of data packet 136.

Controller 124 also periodically polls the switch array 132 associated with the buttons, triggers, and hatswitch, to obtain the data associated with such switches. The information from switches 132 is also, illustratively, subjected to anti-jitter and over-sampling in order to improve the robustness of the signals. This is indicated by block 140.

Controller 124 then determines, based upon the position information from sensors 126 and 128, whether input device 14 is in the velocity zone with respect to the X axis. This is indicated by block 142. If so, controller 124 sets the ZBX bit in packet 136 located in byte 2, bit position 4. This is indicated by block 144.

Next, controller 124 determines whether input device 14 is in the velocity zone relative to the Y axis. This is indicated by block 146. If so, controller 124 sets the ZBY bit in packet 136 located at byte 2, bit position 5. This is indicated by block 148. Controller 124 then assembles the remainder of packet 136, as indicated by block 150, and transmits the packet to computer 20, according to the appropriate protocol, as indicated by block 152.

FIG. 8 is a functional block diagram illustrating the receipt and processing of packet 136 on one representative embodiment of computer 20 which is a personal computer. In other embodiments like when computer 20 is a dedicated computer, the processing may differ somewhat, but will have similar results. FIG. 8 illustrates computer input device 14, bus level layers 153, first bus driver 154, re-mapper 156, application interface 158, and application layer 160, which can be comprised of one or more applications 162, 164 and 166. Prior to discussing the operation of the system illustrated in FIG. 8, it should be noted that, according to conventional USB protocol, devices can be classified as human interface devices (HID). Further, a functional device object (FDO) can contain information related to the data, indicating to the next program module or device, how the data should be handled. FDOs are primarily converters which convert raw data into what a recipient module or device expects to see. Physical device objects (PDOs) are objects which contain data and have associated methods which can be called by a recipient device or module to access the data. Filter device objects (FiDOs) are objects which can examine the data, and based on certain settings (such as settings in the registry) determine what should be done with the data in order to place it in a form in which it can be used by recipients. FDOs, PDOs, and FiDOs are all conventional objects which are well understood by those of ordinary skill in the art.

In operation, device 14 first assembles a packet 136 as discussed previously with respect to FIGS. 6 and 7. The packet is then passed to bus level layers 153 on computer 20. Bus level layers 153 are standard USB layers which act to receive and shuttle the data up through the processing stack to first bus driver 154.

First bus driver 154 is a driver which is wrapped by a HIDCLASS driver wrapper. The packet received from input device 14 is, in one illustrative embodiment, a joystick-type data packet. Other data packets (e.g, mouse, keyboard, etc.) could be used as well. Therefore, first bus driver 154 contains an FDO which identifies the packet as a joystick-type data packet and creates a joystick PDO and hands off the information to the created PDO. The joystick PDO then hands the information upwardly in the stack to re-mapper 156.

Re-mapper 156 is a program module, one illustrative embodiment of which is referred to as GCKERNEL.SYS, which creates objects required by the eventual recipient applications in application layer 160. For example, since the information in packet 136 comes into computer 20 as a joystick packet, and since many gaming applications require point of view information to be transmitted by mouse and/or keyboard manipulation, re-mapper 156 determines whether the joystick information needs to be re-mapped into a mouse and/or a keyboard PDO for subsequent use at application layer 160.

Re-mapper 156 contains FiDOs 170 which receive the information from PDO 155 in first bus driver 154. FiDOs 170 are generally illustrated in the broken out portion of FIG. 8. FiDO 170 receives the information at input port 172 and shuttles it to a correct PDO. FiDO 170 then determines whether this type of input class has been assigned. This is indicated by blocks 174 and 176. If no such assignment has been made, that indicates that the recipient application and application layer 160 simply expects to see the information as joystick information, and the information is passed directly through FiDO 170 to output port 178, where it is transmitted (as indicated by arrow 180, to application layer 160).

However if, in assignment block 174, an assignment of this particular type of input class has been made to a mouse packet, FiDO 170 provides the information to mouse curve filter 182 which creates a mouse PDO with the appropriate data contained therein. Such a virtual mouse PDO is indicated at 184 in re-mapper 156. The mouse PDO is then handed to application interface 158 which is described below.

Further, if FiDO 170 determines that the recipient application in application layer 160 expects to see the information in terms of a keyboard manipulation, the information is provided to Macro Queue 186 which assigns keystrokes to button depressions. This acts to create a virtual keyboard PDO, illustrated by number 188 in re-mapper 156. The information is then again provided to output port 178 where it is transmitted to application interface 158.

In the event that the joystick-type data packet received from device 14 is actually converted into a virtual mouse or virtual keyboard PDO, it is provided to application interface 158. Application interface 158 (also designated, in one illustrative embodiment, as HIDSWVD.SYS) creates a PDO which contains the information in a particular form for mouse or keyboard data which is expected by application layer 160.

Therefore, re-mapper 156 functions to split data received through one pipe (e.g., the joystick pipe) into other pipes (e.g., the mouse and/or keyboard pipes). This allows re-mapper 156 to masquerade joystick data as mouse or keyboard data, or a combination of both, depending upon what the particular application in application layer 160 is expecting to receive.

Re-mapper 156 also serves another function. Re-mapper 156 examines the data and determines whether the data indicates that member 18 is in the absolute or velocity zone, relative to member 16. If it is in the absolute zone, re-mapper 156 simply hands the application (possibly through application interface 158) a difference value which represents the difference between a current position and the most recent previous position, and the direction of offset from the most recent previous position. The application program in application layer 160 can then update the point of view display (or any other object being displayed on display device 15). Similarly, if re-mapper 156 determines that member 18 is in the continuous or velocity zone, re-mapper 156 sends a predetermined difference value to the application, and continues to send that value so long as packets are received from device 14 which indicate that member 18 is in the velocity zone. Also, of course, as described earlier, if the velocity zone is broken into a number of sub-bands or sub-zones, the change value can be changed based upon the particular sub-zone which member 18 currently resides in. Similarly, if the velocity profile has a different shape, as discussed above, the change value is determined accordingly.

FIGS. 9A–9D further illustrate the operation of re-mapper 156. Re-mapper 156 first receives a new packet from device 14. This is indicated by block 190. Re-mapper 156 then examines the position information in the packet to determine whether member 18 is in the absolute zone or the velocity zone. This is indicated by blocks 192 and 194. It should be noted that the same examination and determination are made with respect to both the X and Y axes. However, only a single axis will be described with respect to FIGS. 9A–9C, for the sake of simplicity.

If member 18 is not in the absolute zone, that means it is in the velocity zone and re-mapper 156 determines a change value based on, a current position of member 18 relative to member 16, within the velocity zone. This is indicated by block 196. That change value is then output to application layer 160 (perhaps through application interface 158) as the new position information. This is indicated by block 198. It should be noted that, in determining whether member 18 is in the absolute or velocity zone, re-mapper 156 may implement a certain hysteresis in order to avoid jumping back and forth between the absolute and velocity zones, where member 18 is positioned close to the boundary between the two. This is described with respect to FIGS. 4A and 4B.

If, at block 194, re-mapper 156 determines that member 18 is in the absolute positioning zone, re-mapper 156 then-determines whether member 18 has just entered the absolute positioning zone from the velocity zone. If that is the case, as described with respect to FIG. 4B, re-mapper 156 may wish to have the user center member 18 before actually coming out of the velocity zone behavior. Therefore, in accordance with one embodiment of the present invention, re-mapper 156 determines, at block 200, whether member 18 was just previously in the absolute positioning zone. If not, that indicates that member 18 has just re-entered the absolute positioning zone from the velocity zone. That being the case, re-mapper 156 moves the boundary between the absolute positioning zone and the velocity zone further into the absolute positioning zone to be coincident with the boundary of central zone 116 illustrated in FIG. 4B. This is indicated by block 202. Re-mapper 156 thus continues to provide values indicative of positioning member 18 in the velocity zone until member 18 is positioned to within a predetermined range of nominal center. Given the fact that the boundary between the zones has been moved to the central zone 116, re-mapper 156 determines the change value which is to be sent to the application, based upon the position of member 18. This is indicated in block 204. That value is then output as the new position information to application layer 160. This is indicated by block 198. Of course, as described above with respect to FIGS. 4A and 4B, transitioning between the zones can be handled in a variety of different ways. These are implemented by re-mapper 156 accordingly.

When member 18 is in the absolute positioning zone, and the user is not moving it, the actual position information values provided by the position sensors can fluctuate by several bit positions because of certain tolerances and filtering techniques. If these were recognized by re-mapper 156, the first person perspective view being displayed on display 15 would tend to jitter or jump back and forth based on these minor, and inadvertent, changes in the position information. Therefore, a conventional jitter filter can be employed which ignores changes in the position information where the magnitude of the change is less than a threshold level.

However, ignoring changes tends to reduce resolution resulting in less smooth control. For instance, if the user is moving member 18 about axis 102 continually in the clockwise direction, there is substantially no need to employ a jitter filter, because each sampled value will be larger than the previous. Therefore, is no need to reduce resolution.

For this reason, if, at block 200, it is determined that member 18 is in the absolute positioning zone, and was in the absolute positioning zone during the previous sampling interval, re-mapper 156 then determines whether a slope flag is set. A slope flag is set to indicate a direction of movement of member 18 about the relevant axis where two or more consecutive packets are received which contain position information indicating that the position of member 18 has changed, in the same direction, for two or more consecutive sampling periods.

If that is the case, that indicates that the user has been continually moving member 18 in the same direction for at least two sampling intervals. Determining whether the slope flag is set is indicated by block 206. If the slope flag is not set, that indicates that the user has not been continuously moving member 18 in one direction for two or more consecutive sampling intervals. In that case, re-mapper 156 invokes the jitter filter (described in greater detail with respect to FIG. 9D). This is indicated by block 208. Based upon the output of the jitter filter, re-mapper 156 outputs new position information to the application, as indicated in block 198.

If, at block 206, the slope flag is set, then re-mapper 156 determines whether the change in position of member 18 is in the same direction as the previous slope. If not, that indicates that the user has switched directions of movement. In that instance, it may be desirable to again invoke the jitter filter as indicated by block 208. Determining whether the change in position is in the same direction as the previous slope is indicated by block 210.

If, at block 210, it is determined that the change in position of member 18 is in the same direction as the previous slope, that indicates that the user has simply continued moving member 18 in the same direction, and there is no need to invoke the jitter. filter and encounter the consequent reduction in resolution. Therefore, re-mapper 156, in that case, simply outputs the new position information to the application layer 160, as indicated by block 198.

Once the new position information has been provided to the application, the application updates the display based on the new data from the XY position fields and the remaining data (such as depression of any switches in the button array, etc.). This is indicated by block 212.

FIG. 9C better illustrates invocation of the jitter filter. When the jitter filter is invoked, re-mapper 156 determines whether the change in position from the previous value is greater than a threshold level. This is indicated by block 214. If so, this corresponds to a legitimate change in position, and re-mapper 156 provides the new position information to application layer 160. This is indicated by block 198. However, if, at block 214, it is determined that the change in position from the previous value is not in excess of the threshold value, then re-mapper 156 simply ignores the change in position. This is indicated by block 260.

FIG. 10 is an exploded view of but one illustrative embodiment of computer input device 14, better illustrating a number of the mechanical features thereof. FIG. 10 illustrates computer input device 14 in a position which is inverted from a normal use position. FIG. 10 illustrates that input device 14 has a lower housing 220, and an upper housing 222 which are connected together during assembly. Upper housing 222 has a plurality of cavities 224 for receiving thumb contact portions 226 for the buttons in button array 28. Thumb contact portions 226, in turn, frictionally engage corresponding plungers 228 which act, when depressed, to close switch contacts located on associated printed circuit boards 230.

Finger engaging triggers 32 are pivotally mounted to posts 232 which are secured to upper housing portion 222. Triggers 32 have extending plungers 234, which, when triggers 32 are depressed, engage corresponding switches 236 mounted on printed circuit boards 230.

In addition, hatswitch 30 is mounted, through an aperture in upper housing 222, to shoulder 238. As hatswitch 30 is depressed to various angles (as described with respect to Table 1 above) shoulder 238 acts to close one or more set of switch contacts mounted on printed circuit board 240 (in the embodiment illustrated in FIG. 10, the switches are mounted on a side of printed circuit board 240 opposite that shown).

Linkage (or hinge portion) 22 includes a first cam assembly 242 and a second cam assembly 244, both of which are described in greater detail with respect to FIGS. 12A–14C. Cam assembly 242 allows member 18 to pitch about axis 106, while cam assembly 244 allows member 18 to yaw about axis 102. Input device 14 also illustratively includes a hollow shaft 246 which extends through cam assembly 244 and into cam assembly 242. A wire harness 248 extends through the hollow portion of shaft 246, and carries signals from the various switches and buttons on circuit board 230 on member 18, back to circuit board 230 located on member 16, for further processing.

A sleeve 252 is used to connect shaft 246 to potentiometer 260. Sleeve 252 contains an extending tongue portion 254. Tongue portion 254 is sized to snugly fit within an open upper portion of hollow shaft 246, in order to frictionally engage the interior surface of hollow shaft 246 within the open upper portion. Sleeve 252 also. has an opposite end 256 which includes an opening sized to receive rotational wiper 258 of potentiometer 260 which is mounted to circuit board 230 contained in member 16. When sleeve 252 is assembled onto shaft 246, it rotates along with shaft 246 as member 18 is pitched about axis 106. Since opening 256 in sleeve 252 frictionally engages wiper 258 of potentiometer 260, wiper 258 also rotates along with shaft 246. This provides a potentiometer signal which is indicative of the movement of member 18 about axis 106.

FIG. 11 is a greatly enlarged view of a portion of computer input device 14 illustrated in FIG. 10. Similar items are similarly numbered to those shown in FIG. 10. FIG. 11 illustrates that a second shaft 266 is coupled to member 18 and extends upwardly (in the view shown in FIG. 11) through cam assembly 242. Shaft 266 extends upward through an open portion of shaft 246, and defines axis 102, about which member 18 pivots in the yaw or X direction. Although obscured by cam assembly 242, a potentiometer arrangement, similar to that described with respect to shaft 246 in FIG. 10, is provided for shaft 266, such that an electrical signal indicative of the position of member 18 in the X direction is also provided to circuit board 230 (through wire harness 248).

FIG. 11 also illustrates that the housing for member 18 defines an opening 270 therein. Opening 270 is large enough to provide a slight clearance between housing 268 and annular sleeve 272. Annular sleeve 272 is rigidly coupled to shaft 246, and rotates therewith. In one embodiment, annular sleeve 272 and shaft 246 are integrally molded to one another. Annular sleeve 272 remains in place while member 18 rotates about its exterior periphery. Since annular sleeve 272 extends inwardly, into housing 18, even when member 18 is rotated about axis 102 through its full range of motion, sleeve 272 still maintains substantial closure of aperture 270, so that the inside of housing 268 of member 18 is not exposed.

FIG. 11 also illustrates that cam assembly 244 includes a closure 274 which has an interior periphery sized just larger than the exterior periphery of cam 276. Cam follower 278 is arranged closely proximate cam 276, and is arranged to rotate with shaft 246. A compression spring 280 (illustrated in FIG. 12A) is disposed between the interior wall of closure 274 and an opposing surface of cam 276.

FIGS. 12A–14C better illustrate cam assemblies 242 and 244. While the cam assembly illustrated in these figures can be applied equally to either of the cam assemblies 242 or 244, for the sake of clarity, only cam assembly 244 will be discussed herein. Further, the orientation of the cam and cam follower can be reversed from that illustrated.

FIG. 12A is an exploded view of cam 276, cam follower 278 and compression spring 280, with closure 274 removed. FIG. 12A illustrates that cam 276 has a plurality of cammed surfaces 282 disposed on a substantially flat surface thereof, opposite that shown in FIG. 12A. Similarly, cam 276 includes a shoulder 284 which is sized just larger than an exterior periphery of compression spring 280. Therefore, compression spring 280 abuts cam 276, within the depression defined by shoulder 284.

Cam follower 278 includes a plurality of protrusions 286, which protrude from a substantially flat cam following surface 288. Cam follower 278 is disposed about shaft 246 to rotate with shaft 246.

FIG. 12B illustrates an assembled view of cam assembly 244, with closure 274 removed. FIG. 12B illustrates cam assembly 244 in a neutral position, in which protrusions 286 reside between cammed surfaces 282. The neutral position corresponds to member 18 being within behavioral zone 110 in FIG. 4A.

FIG. 12C is a side sectional view taken through a portion of cam assembly 244 in the neutral position. FIG. 12C better illustrates that, in a neutral position, compression spring 280 exerts a force on cam 276 and cam follower 278, such that the protrusions 286 on cam follower 278 and the cammed surfaces 282 on cam 276 abut substantially flat, opposing surfaces. Therefore, as shaft 246 rotates, the user perceives a substantially constant force created by the friction of protrusions 286 and cammed surfaces 282 sliding along the opposing surfaces under the force exerted by compression spring 280. In one illustrative embodiment, cam 276 and cam follower 278 are formed of an acetal material sold under the tradename Delrin. This material provides a viscous, fluid feel, with light resistance to movement, as the two pieces slide over one another. Of course, other materials could be used as well to provide the desired feel.

FIGS. 13A–13D illustrate cam assembly 244 in a position rotated, for example, approximately 30 degrees relative to the neutral position illustrated in FIGS. 12A–12C. Thus, FIGS. 13A–13D illustrate cam assembly 244 when member 18 has been rotated all the way through zone 110 illustrated in FIG. 4A, and is beginning to transition into one of zones 112 or 114. As can be clearly seen in FIG. 13C, cam surface 282 and protrusions 286 are directly abutting one another under the force of compression spring 280. Therefore, as the user rotates member 18 out of the absolute position zone into the velocity zone, the user feels a distinct increase in resistance to rotation because cam surfaces 282 and protrusions 286 engage one another at that point.

FIGS. 14A–14B and 13D illustrate cam assembly 244 in a position in which it has been rotated, for example, approximately 40 degrees from the neutral position illustrated in FIGS. 12A–12C. Therefore, this corresponds to, for example, one extreme side of zone 112 illustrated in FIG. 4B. As illustrated in FIG. 13D, cam surfaces 282 have engaged the protrusions 286 on cam follower 278, and have been pushed toward one another such that the cam 276 is displaced from cam follower 278. Of course, cam follower 278 is fixed in the vertical direction of the view illustrated in FIG. 13D. Therefore, cam 276 is forced to move upwardly, thereby compressing spring 280. The further that spring 280 is compressed, the greater resistance force exhibited by spring 280. Therefore, when cam follower 278 has been rotated to its full range of motion (e.g., approximately +40 degrees from neutral) spring 280 is exerting its highest degree of force and the user is thus perceiving the greatest resistance to rotation at that point.

FIGS. 15–17 illustrate certain ergonomic aspects of input device 14. FIG. 15A illustrates that members 16 and 18 both have a generally longitudinal axis 290 and 292, respectively. The longitudinal axes of members 16 and 18, in order to obtain a more ergonomically neutral posture, have a slight toe-in angle. For example, shaft 246 defines an axis generally illustrated by number 294 in FIG. 15A. Axes 290 and 292 are toed in by an angle 296 relative to a line generally perpendicular to axis 294. The toe-in angle 296 is illustratively in a range of approximately 10–15 degrees and can be further approximately 12 degrees. Thus, the shape and initial toe-in angle of input device 14 provide the user's wrist in the neutral initial wrist posture. On average, the initial wrist posture for device 14 is approximately 14 degrees extension and 8 degrees ulnar deviation. These values are within a range of neutral posture for the wrist. Neutral wrist flexion/extension is in a range of approximately 0 degrees to 20 degrees extension, while neutral wrist deviation is in a range of approximately 0 degrees to 20 degrees ulnar deviation.

FIG. 15B illustrates a number of spacings to accommodate the thumb width of North American males having thumb widths in the 5th percentile through the $95^{th}$ percentile. The thumb actuated controls (such as hatswitch 30 and the buttons in button array 28) have spacings which are configured to avoid inadvertent actuations. Therefore, the center-to-center spacing 300 of buttons in button array 28 is illustratively in a range of approximately 18 mm to 28 mm, and also can be approximately 21 mm. In addition, the center-to-center spacing 302 of buttons in array 28 is illustratively in excess of about 13 mm, and further is approximately 14.6 mm.

In addition, linkage (or hinge mechanism) 22 illustratively includes a surface 304 on which the thumb of the user's right hand can rest, when not actuating buttons in array 28. The central region of surface 304 also corresponds to the pivot location for pivoting member 18 about axis 102. The distance 306 between the center of the four button array 28 on member 18 and the pivot axis 102 is illustratively in a range of approximately 7 mm to 47 mm. Distance 306 is further illustratively in a range of approximately 25–30 mm and may be approximately 27 mm.

Distance 308, from the pivot axis 102 to the center of four button array 28 is configured to accommodate the range of motion for a typical thumb swing. Distance 308 is illustratively in a range of approximately 30–40 mm, and may be approximately 34.6 mm.

Direction pad 30 also has a size which accommodates males having a thumb width in the fifth percentile to $95^{th}$ percentile, and is configured to avoid inadvertent actuations. Therefore, hatswitch 30 has a length 310 which is illustratively in a range of approximately 20–30 mm and may be approximately 28.4 mm. In addition, hatswitch 30 has a width 312 which is illustratively in a range of approximately 18 to 28 mm and can be approximately 22.5 mm.

FIG. 16A is a perspective view taken from a front lower side of input device 14. FIG. 16A illustrates that the hand grips of members 16 and 18 have a lower, finger-engaging portion 314 and 316 which is textured to increase grip friction. The texture can be any friction enhancing surface, such as a low durometer material, ridges formed therein, or roughly textured plastic.

FIG. 16B is a sectional view taken along section line 16B—16B in FIG. 16A. FIG. 16B illustrates that the edges of the handle portion of member 16 are rounded and shaped in a convex arc which is configured to fit the concave arc of the palmer region of the user's hand. Similarly, the overall diameter 320 of the handle portions is configured to accommodate the North American male having a palm size in the fifth percentile to $95^{th}$ percentile range. Thus, the diameter 320 is illustratively in a range of approximately 43 mm to 53 mm and can be approximately 50 mm. Similarly, the girth (or outer periphery) of the handle portions of members 16 and 18 is illustratively in a range of approximately 120–145 mm, and can be approximately 133 mm.

FIG. 17 is a cross-section of member 18 taken along axis 292 shown in FIG. 15A. The length 322 of the handle portion of member 18 is illustratively configured to accommodate the palm width of North American males in the fifth percentile to $95^{th}$ percentile range. Thus, length 322 is illustratively in excess of approximately 86 mm, and may also be in excess of approximately 105 mm, and further may be approximately 131 mm. FIG. 17 also better illustrates that members 16 and 18 are embodied somewhat as a pistol grip in that the handle portions thereof extend rearwardly and downwardly from the pad area which supports button array 28 and hatswitch 30. A distance 324 from the center of the four button array 28 located on member 18 to the end of the handle portion of member 18 is illustratively in a range of approximately 90 to 100 mm and can be approximately 97.5 mm.

The location of trigger 32 is configured such that it can be actuated by the tip of the index finger when the hand and fingers are in a pistol grip configuration on the handle portion of member 18. A distance 326 from the center of the four button array 28 on member 18 to the forward surface of trigger 32 accommodates North American males having finger length in a fifth percentile to $95^{th}$ percentile range. This is accomplished by enabling the small end of the target population to reach the surface of trigger 32 when the hand is in a pistol grip. Thus, distance 326 is less than approximately 45 mm, and may be less than approximately 35 mm, and may further be approximately 33.5 mm.

In addition, the weight of device 14 is illustratively small enough so the device can be used for a prolonged period without causing substantial user fatigue. Thus, in one illustrative embodiment, device 14 weighs in a range of approximately 225 to 345 grams. Device 14 can also weigh approximately 284 grams.

CONCLUSION

Thus, the present invention provides a user input device to a computer which has two members which are rotatable and articulable relative to one another and provide a signal indicative of that movement. The present invention illustratively provides movement between two or more ranges of motion which is sensed and can be used to change the behavioral characteristics of an object being displayed. Similarly, the device is configured with components thereof having sizes and shapes to accommodate ergonomic actuation.

Although the present invention has been described with reference to preferred embodiments, workers skilled in the art will recognize that changes may be made in form and detail without departing from the spirit and scope of the invention.

What is claimed is:

1. A method of controlling a visual display of a computer based on an input from a hand held computer input device having a first portion which is movable relative to a second portion of the device in a first direction through a first range of motion about a first axis of rotation that is divided into a first plurality of behavioral zones, each behavioral zone corresponding to a different behavior attributed to a displayed item, the method comprising:

receiving a data packet from the computer input device, the packet including position information indicative of a position of the first portion of the computer input device relative to the second portion of the computer input device, the position information including first axis information indicative of a position of the first portion in the first range of motion;

determining, based on information contained in the data packet, which of the plurality of behavioral zones included in the first range of motion the first portion is located in by examining the first axis information; and utilizing the position information and the behavioral zone to update position of displayed information provided on the display and change a way information is displayed given the position information.

2. The method of claim 1 wherein the first portion is movable relative to the second portion through a second plurality of behavioral zones, and further comprising:

determining which of the second plurality of behavioral zones the first portion is located in, based on the data packet; and utilizing the position information and the behavioral zone in the first and second plurality of behavioral zones in which the first handle is located to update information provided on the display.

3. The method of claim 1 wherein the first is movable relative to the second portion through a second range of motion about a second axis of rotation, the second range of motion including the second plurality of behavioral zones, and wherein the position information includes second axis information indicative of a position of the first portion in the second range of motion, and wherein the determining step comprises:

examining the second axis information to determine which of the second plurality of behavioral zones the first portion is located in.

4. The method of claim 1 wherein the data packet includes zone indicator information in addition to the position information and wherein determining. comprises:

examining the zone indicator information.

5. The method of claim 4 wherein determining comprises:

examining the zone indicator information and the position information.

6. The method of claim 1 and further comprising:

maintaining previous movement information indicative of a most recent previous direction of movement of the first portion relative to the second portion; and filtering the position information based on the previous movement information.

7. The method of claim 6 wherein filtering comprises:

determining whether a current direction of movement of the first portion relative to the second portion is the same as the most recent previous direction of movement;

if so, avoiding filtering of the position information; and if not, subjecting the position information to filtering.

8. The method of claim 7 and further comprising:

if the position information indicates that the first portion is stationary relative to the second portion, subjecting the position information to filtering.

9. The method of claim 1 and further comprising:

maintaining previous zone information indicative of a behavioral zone in which the first portion was most recently previously located.

10. The method of claim 9 wherein the utilizing step comprises:

updating information on the visual display according to a behavior, based on the behavioral zone in which the first portion is currently located and based on the previous zone information.

11. The method of claim 10 wherein updating information on the visual display is performed so as to control the object being displayed according to a first behavior corresponding to a first of the plurality of behavioral zones when the previous zone information indicates that the first portion was most recently in the first behavioral zone and when the position information indicates that the first portion is currently in the first behavioral zone.

12. The method of claim 11 wherein the output to the visual display control application is provided to control the object being displayed according to a second behavior corresponding to a second of the plurality of behavioral zones when the previous zone information indicates that the first portion was most recently in the second behavioral zone and when the position information indicates that the first portion has currently returned to the first behavioral zone, until the first portion has reached a predetermined location within the first behavioral zone.

13. The method of claim 11 wherein the output to the visual display control application is provided to control the object being displayed according to a third behavior when the previous zone information indicates that the first portion was most recently in a second behavioral zone and when the position information indicates that the first portion has currently returned to the first behavioral zone, until the first portion has reached a predetermined location within the first behavioral zone.

14. The method of claim 13 wherein the third behavior comprises a null behavior in which the output provided to the display control application is indicative of no movement of the first portion relative to the second portion within the first behavioral zone until the first portion has reached a predetermined location within the first behavioral zone.

15. The method of claim 1 wherein a first of the plurality of behavioral zones comprises an absolute position zone such that when the first portion is in the absolute position zone, the utilizing step comprises:

providing an absolute position output such that an absolute view of an object being displayed is based on an absolute position of the first portion relative to the second portion, as indicated by the position information.

16. The method of claim 15 wherein a second of the plurality of behavioral zones comprises a velocity zone such that when the first portion is in the velocity zone, the utilizing step comprises:

providing a velocity output such that a view of an object being displayed changes substantially continuously at a speed based on a position of the first portion relative to the second portion, as indicated by the position information.

17. The method of claim 1 wherein receiving a data packet comprises receiving the data packet in a form corresponding to a first input device type and wherein the utilizing step comprises:

providing an output to a visual display control application in a form corresponding to an expected input device type, expected by the visual display control application.

18. The method of claim 17 wherein providing the output in a form corresponding to an expected input device type, expected by the visual display control application, comprises:

determining the expected input device type; and converting the data packet to the output in the form corresponding to the expected input device type.

19. The method of claim 18 wherein the first input device type comprises a joystick and wherein the expected input device type comprises at least one of a mouse and a keyboard and wherein converting comprises:

converting the data packet to a form corresponding to a mouse or a keyboard.

20. A method of forming a data packet for transmission from a computer input device to a computer, the method comprising:

obtaining position information indicative of a position of a first portion on the computer input device relative to a second portion on the computer input device, the position information corresponding to a desired position of a displayed item, the first and second portions being movable relative to one another in one direction through a plurality of behavioral zones, each behavioral zone corresponding to a behavior of a displayed item that changes a way information is displayed given the position information;

obtaining actuator information indicative of a state of a plurality of actuators on the computer input device;

placing the position information and actuator information in the data packet; and determining, based on the position information, whether the first portion is in a first of the plurality of behavioral zones relative to the second portion and obtaining zone information indicative of the determination.

21. The method of claim 20 and further comprising:

placing the zone information in the data packet.

22. The method of claim wherein obtaining position information comprises:

obtaining information indicative of a position of the first portion relative to the second portion about first and second axes of rotation.

23. The method of claim 22 wherein the determining step comprises:

determining whether the first portion is in a first of a plurality of behavioral zones about both the first and second axes of rotation.

* * * * *

UNITED STATES PATENT AND TRADEMARK OFFICE
CERTIFICATE OF CORRECTION

PATENT NO. : 6,664,946 B1
DATED : December 16, 2003
INVENTOR(S) : Stipes et al.

It is certified that error appears in the above-identified patent and that said Letters Patent is hereby corrected as shown below:

Column 5,
Line 40, after "(USB)" insert -- . --

Column 11,
Line 67, second "of" should be -- Of --

Column 15,
Line 22, after "on" delete ","

Column 16,
Line 48, after "jitter" delete "."

Column 17,
Line 28, "FIGS. 12A-14C" should be -- FIGS. 12A-14B --

Column 18,
Line 48, "FIGS. 12A-14C" should be -- FIGS. 12A-14B --

Column 24,
Line 24, after "claim" insert -- 20 --

Signed and Sealed this

Thirty-first Day of May, 2005

JON W. DUDAS
*Director of the United States Patent and Trademark Office*